United States Patent
Tesov

(10) Patent No.: US 12,123,733 B2
(45) Date of Patent: Oct. 22, 2024

(54) SURFACE DETECTION AND GEOLOCATION

(71) Applicants: Google LLC, Mountain View, CA (US); Alexander Yuryevich Tesov, Mountain View, CA (US)

(72) Inventor: Alexander Yuryevich Tesov, Palo Alto, CA (US)

(73) Assignee: GOOGLE LLC, Mountain View, CA (US)

( * ) Notice: Subject to any disclaimer, the term of this patent is extended or adjusted under 35 U.S.C. 154(b) by 287 days.

(21) Appl. No.: 17/606,598

(22) PCT Filed: Oct. 29, 2020

(86) PCT No.: PCT/US2020/057869
§ 371 (c)(1),
(2) Date: Oct. 26, 2021

(87) PCT Pub. No.: WO2022/093224
PCT Pub. Date: May 5, 2022

(65) Prior Publication Data
US 2022/0307854 A1    Sep. 29, 2022

(51) Int. Cl.
*G01C 21/36* (2006.01)
*G01C 21/00* (2006.01)
(Continued)

(52) U.S. Cl.
CPC ......... *G01C 21/3602* (2013.01); *G01C 21/30* (2013.01); *G01C 21/3885* (2020.08); *H04W 4/025* (2013.01); *H04W 4/029* (2018.02)

(58) Field of Classification Search
CPC .............. G01C 21/3602; G01C 21/30; G01C 21/3885; H04W 4/029; H04W 4/025
(Continued)

(56) References Cited

U.S. PATENT DOCUMENTS

| 10,791,050 B2 * | 9/2020 | Varney | H04L 41/509 |
| 2009/0093238 A1 * | 4/2009 | Ziskind | H04W 4/02 455/456.2 |

(Continued)

FOREIGN PATENT DOCUMENTS

| EP | 2787324 | 10/2014 |
| WO | WO 2019/097422 | 5/2019 |

OTHER PUBLICATIONS

International Search Report and Written Opinion for Application No. PCT/US2020/057869, mailed Aug. 31, 2021, 19 pages.
(Continued)

*Primary Examiner* — Mahmoud S Ismail
(74) *Attorney, Agent, or Firm* — DORITY & MANNING P.A.

(57) ABSTRACT

Methods, systems, devices, and tangible non-transitory computer readable media for surface detection and geolocation are provided. The disclosed technology can receive location request data associated with a request for a geographic location of a user device in an environment. Based on the location request data, images of segments of a surface of the environment can be accessed. The geographic location of the user device can be determined based on the segment signatures that match stored segment signatures respectively associated with stored geographic locations. The segment signatures can be based on the images of the segments of the surface of the environment. Map data including information associated with a geographic area can be accessed. Furthermore, indications can be generated and the indications can include information associated with the geographic location of the user device within the geographic area.

20 Claims, 9 Drawing Sheets

(51) Int. Cl.
*G01C 21/30* (2006.01)
*H04W 4/02* (2018.01)
*H04W 4/029* (2018.01)

(58) Field of Classification Search
USPC ........................................................ 701/523
See application file for complete search history.

(56) References Cited

U.S. PATENT DOCUMENTS

| | | | |
|---|---|---|---|
| 2015/0256631 A1* | 9/2015 | Gordon | H04L 43/08 |
| | | | 701/532 |
| 2018/0109668 A1* | 4/2018 | Pelly | H04W 4/025 |
| 2020/0279395 A1* | 9/2020 | Buda | G01C 11/06 |
| 2021/0025725 A1* | 1/2021 | Braunstein | G01C 21/3644 |

OTHER PUBLICATIONS

International Preliminary Report on Patentability for Application No. PCT/US2020/057869, mailed May 11, 2023, 12 pages.

* cited by examiner

SURFACE DETECTION AND GEOLOCATION

PRIORITY CLAIM

This application is based upon and claims the right of priority under 35 U.S.C. § 371 to International Application No. PCT/US2020/057869 filed on Oct. 29, 2020. Applicant claims priority to and the benefit of each of such applications and incorporates all such applications herein by reference in their entirety.

FIELD

The present disclosure relates generally to geolocation and in particular to a system for determining a location based on the detection of surfaces by sensors.

BACKGROUND

Operations associated with mapping a geographic area can be implemented on a variety of computing devices. These operations can include processing data associated with the geographic area for later access and use by a user or computing system. Further, the operations can include exchanging data with remote computing systems. However, the types of operations that are performed and the way in which the operations are performed can vary over time, as can the underlying hardware that implements the operations. Accordingly, there are different ways to leverage computing resources associated with mapping a geographic area.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method of on-device geolocation. The computer-implemented method can include receiving, by a user device including one or more processors, location request data associated with a request for a geographic location of a user device in an environment. The computer-implemented method can include accessing, by the user device, based at least in part on the location request data, one or more images of one or more segments of a surface of the environment. The computer-implemented method can include determining, by the user device, the geographic location of the user device based at least in part on the one or more segment signatures that match one or more stored segment signatures respectively associated with one or more stored geographic locations. The one or more segment signatures can be based at least in part on the one or more images of the one or more segments of the surface of the environment. The computer-implemented method can include accessing, by the user device, map data including information associated with a geographic area. Further, the computer-implemented method can include generating, by the user device, one or more indications including information associated with the geographic location of the user device within the geographic area.

Another example aspect of the present disclosure is directed to one or more tangible non-transitory computer-readable media storing computer-readable instructions that when executed by one or more processors cause the one or more processors to perform operations. The operations can include receiving location request data associated with a request for a geographic location of a user device in an environment. The operations can include accessing, based at least in part on the location request data, one or more images of one or more segments of a surface of the environment. The operations can include determining the geographic location of the user device based at least in part on the one or more segment signatures that match one or more stored segment signatures respectively associated with one or more stored geographic locations. The one or more segment signatures can be based at least in part on the one or more images of the one or more segments of the surface of the environment. The operations can include accessing map data including information associated with a geographic area. Further, the operations can include generating one or more indications including information associated with the geographic location of the user device within the geographic area.

Another example aspect of the present disclosure is directed to a computing system that can include: one or more processors; and one or more tangible non-transitory computer-readable media storing instructions that when executed by the one or more processors cause the one or more processors to perform operations. The operations can include receiving location request data associated with a request for a geographic location of a user device in an environment. The operations can include accessing, based at least in part on the location request data, one or more images of one or more segments of a surface of the environment. The operations can include determining the geographic location of the user device based at least in part on the one or more segment signatures that match one or more stored segment signatures respectively associated with one or more stored geographic locations. The one or more segment signatures can be based at least in part on the one or more images of the one or more segments of the surface of the environment. The operations can include accessing map data including information associated with a geographic area. Further, the operations can include generating one or more indications including information associated with the geographic location of the user device within the geographic area.

Other example aspects of the present disclosure are directed to other methods, systems, devices, apparatuses, or tangible non-transitory computer-readable media for surface detection and geolocation.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
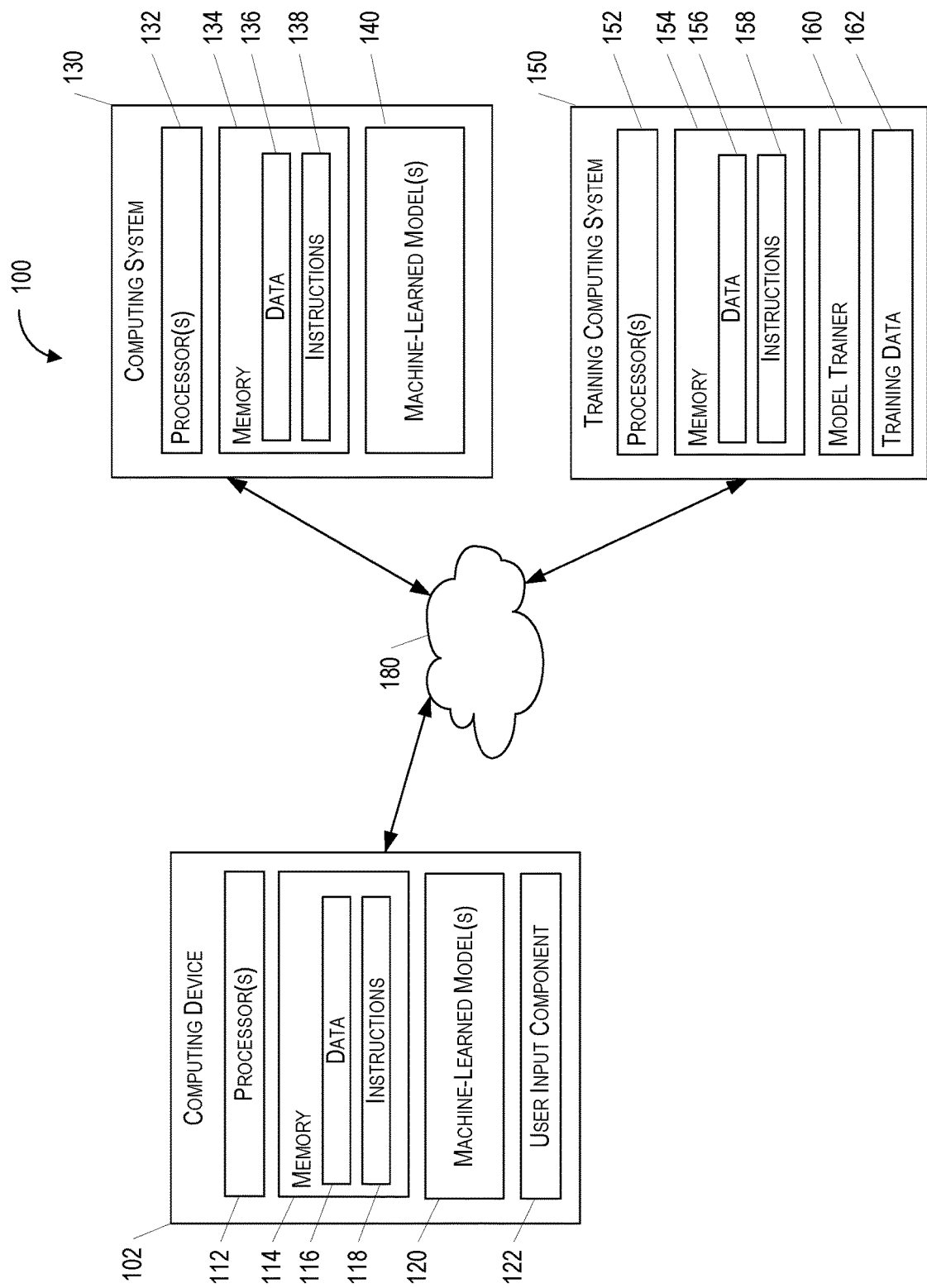
FIG. 1 depicts a diagram of an example system according to example embodiments of the present disclosure.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to a computing system that can generate geolocation information that includes the geographic location of a user device that detects surfaces (e.g., ground surfaces) using sensors. In particular, the disclosed technology can be used to generate indications of a geographic location based on matching segment signatures associated with images of a surface to stored segment signatures associated with stored images of stored geographic locations. As described in more detail below, the disclosed technology is advantageous partly because a geographic location of a user device can be determined without the need for external communication, and therefore can be carried out even at locations in which Global Positioning Satellite (GPS) signals or cellular connectivity is unavailable or limited. On-device geolocation can also be more efficient due to the reduction in resource consumption and latency that results from not having to communicate with external sources (e.g., GPS or other location data). The indications generated by the disclosed technology can be used in various ways including geolocation of various devices including personal computing devices and/or vehicles.

Further, the geographic location of the user device can be determined on-device by using a camera of the user device and a database of stored segment signatures. On-device determination of the geographic location of the user device means that the user device is not required to resort to the use of external signals including global positioning system signals and/or cellular tower signals. By way of example, the geolocation information generated by the disclosed technology can be used to determine the location of a vehicle as it travels through an environment (e.g., a city center with skyscrapers that block cellular signals) in which the availability or accuracy of other forms of geolocation is limited.

The disclosed technology can be implemented in a computing system and/or computing device (e.g., a user device) that is configured to access data (e.g., send and/or receive data), perform operations on the data (e.g., detect features of images, generate segment signatures, and match the segment signatures to stored segment signatures), and generate output including indications associated with the geographic location of the computing device within the geographic area. In some embodiments, the computing system and/or computing device can be used by a vehicle that is operated within a geographic area and is configured to send and/or receive data and/or information from the computing system and/or computing device. Furthermore, the computing system can include a server that receives data associated with the geographic location of a user device.

By way of further example, the computing device (e.g., a user device) can receive location request data based on a user's request for the current geographic location of the user device. For example, a user can issue a voice command requesting the current geographic location of the user device. In response to receiving the location request data, the computing device can access images of segments of the surface of the environment in which the computing device is located. The computing device can then use the images to generate segment signatures that are associated with unique features of the images. The computing device can then determine whether the segment signatures match stored segment signatures associated with previously visited geographic locations. The computing device can, for example, use a hash function and hash table to determine if a segment signature matches one of the stored segment signatures associated with the hash table. If the segment signature matches a stored segment signature, the geographic location of the user device can be determined and the computing device can generate output including an indication (e.g., text displayed on a display of the user device) of the geographic location of the user device.

Accordingly, the disclosed technology can improve the effectiveness and safety of geolocation by providing a user with the location of a user device that can be determined on-device. For example, the use of segment signatures can provide a user with a location that can be within a meter or several centimeters of their actual location, which is in contrast with other ways of determining geographic location that can be much less precise. Further, the disclosed technology can assist a user in more effectively performing the technical task of geolocation in a potentially complex environment that may include structures that obstruct signals that may otherwise be used to determine the geographic location of a computing device. In addition to improving the safety of geolocation by allowing the user to determine their geographic location without using external signals, the disclosed technology can also indicate previously visited locations based on the stored geographic locations.

As such a number of advantages can be realized. First, by reducing and/or eliminating the need to communicate with a remote source, the computing device can determine its geographic location rapidly on the device itself, thereby avoiding superfluous communications which can drain the device's battery. Furthermore, through reduction of unnecessary communications with a remote source, network resources (e.g., network bandwidth) can be conserved. In this way, the present disclosure provides a way to perform the technical task of geolocation in a manner that reduces power consumption and preserves network resources.

The computing system can access, receive, obtain, retrieve, and/or generate location request data associated with a request for a geographic location of a user device in an environment. The term "environment" used herein can refer to a geographic area in which the user device is located (e.g., the general geographic area proximate the user device). The geographic location that is determined using the disclosed techniques can refer to the specific location of the device within that environment. In some embodiments, the environment can include a geographic area within a predetermined distance and/or radius of the user device and/or the geographic area within the range of one or more sensors associated with the user device.

The location request data can be received based at least in part on a user interaction with the computing system in which the user requests the current location of a user device (e.g., a vehicle or smartphone) that the user is using. For example, a user can interact with the user interface of a computing device and use one or more tactile interactions (e.g., pressing visual user interface elements) and/or auditory interactions (e.g., make a spoken request for the current location of the user device) to generate the location request data that can be used to obtain the geographic location of the user device.

Further, the location request data can be generated by the computing system on a periodic basis or when some condition has been satisfied. For example, the computing system can generate the location request data periodically after some predetermined amount of time (e.g., every five (5) seconds, every minute, or every hour). By way of further example, the computing system can generate the location request data when a condition such as the current location of the user device not being determined for more than a predetermined amount of time has been met. For example, the location request data can be generated when the geographic location of the user device has not been determined for more than thirty (30) seconds. In the preceding examples, a user does not have to interact with the computing system in order for the location request data to be generated. The location request data can be automatically generated on a periodic basis. As such, user distractions can be mitigated, thereby enabling an improvement in the safety of geolocation as described herein.

The computing system can access, receive, retrieve, and/or obtain data and/or information including one or more images of one or more segments of a surface of the environment. The one or more segments of the surface of the environment can be associated with the one or more images. Further, the one or more images can include color, greyscale, and/or black and white images of one or more segments of a surface that, in some embodiments, can be the same resolution (e.g. twelve (12) megapixel images) or different resolutions; and/or have the same color depth (e.g. 24-bit) or different color depth (e.g., 8-bit). The one or more images of the surface of the environment can be captured from various angles. For example, the one or more images of the surface of the environment can be captured at a direct top view angle. In some embodiments, the angle at which the one or more images are captured can be an oblique angle (e.g., the lens of the camera is tilted one (1) to fifteen (15) degrees from being parallel to the ground).

The one or more segments of a surface can include one or more segments of any size (e.g., the same size or different sizes) of a surface of an environment. The surface can be associated with any number of the one or more segments (e.g., a single segment or a plurality of segments). Further, the surface can include any type of surface. For example, the surface can include a ground surface (e.g., a road, a sidewalk, a field, a lawn, a street, a bridge, and/or a parking lot) that can include any type of artificial material (e.g., concrete, asphalt, brick, metal, gravel, wood, rubber, glass, and/or plastic) and/or natural material (e.g., grass, dirt, and/or clay). Further, the surface can include one or more surfaces of walls (e.g., walls of buildings and/or tunnels), one or more surfaces of curbs, one or more surfaces of road barriers, and/or one or more surfaces of trees. The surfaces can include painted surfaces that can include ground surfaces (e.g., road surfaces or street surfaces) that include lane markings, speed indications, and/or other traffic markings. Further, the road surfaces can include one or more surfaces of urban roads, highways, and/or alleyways.

In some embodiments, the one or more images can be based at least in part on detection of the environment by one or more sensors that can include one or more visible spectrum cameras, one or more infrared cameras, one or more light detection and ranging (LiDAR) devices, and/or one or more sonar devices. For example, the one or more sensors can include one or more cameras that are directed at the surface of the environment, and which are configured to capture the one or more images of the surface of the environment. By way of further example, the one or more images of the one or more segments of the surface of the environment can be based at least in part on one or more still images captures by the one or more cameras and/or motion video imagery captured by the one or more cameras.

In some embodiments, the one or more images can be based at least in part on a plurality of light detection and ranging (LiDAR) returns associated with the geographic area. For example, the one or more images of the geographic area can include one or more LiDAR returns that are based at least in part on detection of the one or more segments of the surface of the environment.

Further, the one or more images can be based at least in part on any combination of the one or more images captured by a plurality of the sensors. For example, the one or more images can be based at least in part on some combination of the one or more images captured by a visual spectrum camera and an infrared camera. Using multiple types of sensors to capture the one or more images may result in more effective image capture and can provide one type of imagery (e.g., infrared) where another type of imagery does not capture an adequate image.

Accessing, receiving, and/or obtaining the one or more images can be based at least in part on the location request data. For example, the location request data can cause the computing system to access one or more images of the surface of the environment that were captured by one or more sensors (e.g., one or more cameras). By way of further example, the location request data can cause the computing system to use the one or more sensors to capture the one or more images of the surface of the environment. In this way, the one or more images can be captured at the time when the location request data is requested by the user and/or accessed by the device. As such the captured image can provide an accurate representation of the location of the device at the time the request is made. Additionally, capturing the one or more images at the time the location request is requested may result in less usage of storage space, which will not be unnecessarily occupied by previously captured images, thereby making better use of the storage space available on the user device.

The computing system can generate and/or determine one or more segment signatures. The one or more segment signatures can be generated based at least in part on the one or more images. For example, the computing system can analyze the one or more images to determine one or more features of each of the one or more images. The one or more features of the one or more images can then be used to determine the one or more segment signatures which can uniquely identify each of the one or more segment signatures. For example, the visual appearance of each of the one or more segment signatures can be used to generate a unique numerical value that can be associated with the one or more segment signatures respectively.

Generating the one or more segment signatures can include determining one or more features of the one or more images based at least in part on performance of one or more feature detection operations on the one or more images. For example, the one or more images can be used as part of an input on which the one or more feature detection operations including detection of one or more visual features.

Further, generating the one or more segment signatures can include generating the one or more segment signatures based at least in part on the one or more features of the one or more images. For example, each of the one or more features of the one or more images can be associated with a feature value, which in combination with other features can be used to generate a unique identifier for an image that can be used as a segment signature.

In some embodiments, the one or more features can include one or more features associated with the surface of the environment. The one or more features of the surface of the environment can include one or more road surface textures, one or more road markings, and/or one or more pavement cracks. Further, the one or more features of the surface that are depicted in the one or more images can include one or more colors, one or more shapes, and/or one or more textures.

The one or more images can include a plurality of points (e.g., pixels) each of which includes information associated with visual information of the image including a hue, saturation, and brightness. In some embodiments, the computing system can determine the one or more features of the one or more images based at least in part on analysis of a plurality of feature vectors that are associated with each of the plurality of points in each of the one or more images respectively.

In some embodiments, the one or more stored signatures can be associated with one or more time stamps respectively. The computing system can use the one or more time stamps to organize the one or more stored signatures based on the time of day and/or the time of year at which the one or more stored signatures were generated. The computing system can, in some embodiments, match the one or more segment signatures to the one or more stored segment signatures based at least in part on the one or more time stamps. For example, if the time of day is noon, the one or more segment signatures can, if possible, be compared to one or more stored segment signatures that were generated during the day. Further, the computing system can compare the one or more segment signatures that were generated during the summer to one or more stored segment signatures with timestamps that indicate the one or more stored segment signatures were generated during the summer. The use of the one or more time stamps can improve the accuracy of matching segment signatures to stored segment signatures, because the appearance of the associated images may change based at least in part on the time of day and/or year (e.g., a different season). Further, the use of the one or more time stamps can lead to more accurate geolocation determination, since the one or more segment signatures may be more likely to correctly match the one or more stored segment signatures.

In some embodiments, the one or more feature detection operations can include one or more operations associated with a scale-invariant feature transform (SIFT) technique, one or more operations associated with a gradient location and orientation histogram technique, and/or one or more operations associated with a histogram of oriented gradients technique. For example, the scale-invariant feature transform technique can be applied to the one or more images to determine one or more features of the one or more images that are unique and which can be used to generate the one or more segment signatures. By way of further example, the computing system can use SIFT to perform one or more operations including extraction of the one or more features of the one or more images in a manner that is less susceptible to changes in image scale, illumination, and/or noise.

The computing system can determine the geographic location of the user device and/or the one or more segments associated with the one or more images. The geographic location of the user device and/or the one or more segments of the one or more images can be based at least in part on one or more segment signatures that match one or more stored segment signatures respectively associated with one or more stored geographic locations. The one or more segment signatures can be based at least in part on the one or more images of the one or more segments of the surface of the environment. For example, the computing system can perform one or more operations including one or more comparisons of the one or more segment signatures to the one or more stored segment signatures. Based at least in part on the one or more comparisons, the computing system can determine the one or more segment signatures that match the one or more stored segment signatures. Each of the one or more stored geographic locations can be associated with one or more respective latitudes, one or more respective longitudes, and/or one or more respective altitudes (the elevation).

Matching the one or more segment signatures to the one or more stored segment signatures can be based on a level of similarity between the one or more segment signatures and the one or more stored segment signatures exceeding a threshold level of similarity. By way of example, the threshold level of similarity can be associated with a proportional amount (e.g., a percentage of matches between the one or more segment signatures and the one or more stored segment signatures) and/or a predetermined amount (e.g., a number of one or more features of the one or more segment signatures that match one or more features of the one or more stored segment signatures).

In some embodiments, determining the geographic location of the user device and/or the one or more segments associated with the one or more images; and/or determining the one or more segment signatures that match one or more stored segment signatures can include determining whether the one or more segment signatures satisfy one or more matching criteria. The one or more matching criteria can be associated with an amount of similarity between the one or more segment signatures and the one or more stored segment signatures. For example, an amount of similarity can be a proportion of the information in a segment signature that is the same as the information in a stored segment signature. Further, satisfying the one or more matching criteria can include a predetermined portion of the one or more features associated with the one or more segment signatures matching one or more stored features associated with the one or more stored segment signatures. Further, the one or more matching criteria can include a threshold similarity. Satisfying the one or more matching criteria can include an amount of the one or more features associated with the one or more segments exceeding the threshold similarity. For example, a segment signature can be determined to match a stored segment signature if greater than ninety-nine percent (99%) of the information in the segment signature matches the information in the stored segment signature. By way of further example, the segment signature can be determined to match a stored segment signature if greater than eighty-five percent (85%) of the information in the segment signature matches the information in the stored segment signature.

In some embodiments, the threshold similarity can be a different value ranging from a low level of matching (e.g., at least ten percent (10%) matching between the one or more segment signatures and the one or more stored segment signatures), to an intermediate level of matching (e.g., at least fifty percent (50%) matching between the one or more segment signatures and the one or more stored segment signatures), to a high level of matching (e.g., at least eighty percent (80%) matching between the one or more segment signatures and the one or more stored segment signatures).

In some embodiments, the one or more stored segment signatures and/or the associated one or more stored geographic locations can be indexed in a hash table. For example, each of the one or more stored segment signatures can be an index value in the hash table or associated with a corresponding index value in the hash table. The hash table can then be used to determine whether any of the one or more segment signatures match the one or more stored segment signatures in the hash table.

Further, determining the geographic location of the user device and/or the one or more segments associated with the one or more images; can include determining, by the user device, based at least in part on use of a hash function, the one or more segment signatures that match the one or more stored segment signatures that are indexed in the hash table. For example, each of the one or more stored segment signatures can be respectively associated with a corresponding stored geographic location. When a segment signature is determined to match a stored segment signature, the stored geographic location associated with the stored segment signature can be determined to be the location of the user device.

Determining the geographic location of the user device can include performing one or more sequence matching operations to determine similarity between one or more sequences of the one or more segment signatures and one or more sequences of the one or more stored segment signatures. For example, the computing device can determine that the one or more segment signatures include two or more segment signatures and can then compare sequences (each sequence including at least two segment signatures) to a sequence of the one or more stored segment signatures that includes at least two stored segment signatures. Similarity between the one or more segment signatures can be based at least in part on a predetermined portion or threshold amount of the sequence of the one or more segment signatures matching a sequence of the one or more stored segment signatures.

Further, determining the geographic location of the user device can include determining that the one or more segment signatures match the one or more stored segment signatures when a threshold amount of the one or more sequences of the one or more segment signatures matches the one or more sequences of the one or more stored segment signatures. The threshold amount can be a predetermined portion of the one or more sequences of the one or more segment signatures match the one or more sequences of the one or more stored segment signatures. By way of example only, the threshold amount can be a ninety-nine percent (99%) proportion, a ninety-five percent (95%) proportion, or a ninety percent (90%) proportion of the one or more sequences of the one or more segment signatures matching the one or more sequences of the one or more stored segment signatures.

The computing system can access data and/or information that can include map data. The map data can include information associated with a geographic area. For example, the map data can include one or more maps of a geographic area that can include one or more map indications to show the locations of roads, buildings, bodies of water (e.g., lakes, rivers, and/or canals), natural geographic features (e.g., mountains). Further, the map data can include street addresses, the locations of landmarks (e.g., famous buildings and/or statues). The map data can include a three-dimensional representation of the geographic area. For example, the map data can include topographical features of the geographic area. In some embodiments, the map data can be associated with the most recently determined location of the user device. For example, the map data can include information associated with a fifty (50) kilometer radius around the most recently determined location of the user device. Further, in some embodiments, the map data can include a map of a geographic area including any portion of a nation, a state, a province, a county, and/or a city or town.

The computing system can generate one or more indications that can include information associated with the geographic location of the user device within the geographic area. The one or more indications can include text, images (e.g., photographs, icons, pictures, and/or a graphical user interface), and/or auditory indications (e.g., a synthetic voice announcing information associated with the geographic location). Further, the one or more indications can include data and/or information that can be communicated to another computing system. For example, the one or more indications can include information associated with the location of the user device that can be communicated to a remote computing system or an autonomous vehicle associated with the user device. By way of further example, the one or more indications can include one or more indications can include a set of coordinates (e.g., latitude, longitude, and/or altitude associated with the geographic location of the user device).

The one more indications can include a visual representation of the user device within the geographic area. For example, the visual representation can include a map of a predetermined portion of the geographic area (e.g., a square shaped twenty (20) square kilometer area) with an indicator of the user device at the center of the map.

The computing system can determine one or more street addresses and/or one or more landmarks located within a predetermined distance of the geographic location of the user device. For example, the computing system can use map data and the geographic location of the user device to determine the street addresses of streets and one or more landmarks within a one (1) kilometer radius of the user device.

The computing system can generate one or more indications associated with the one or more street addresses or one or more landmarks. For example, the computing device can generate one or more visual indications that show the location of the one or more street addresses and/or one or more landmarks. The one or more visual indications can include textual descriptions (e.g., the names of streets and roads) and/or imagery that can show the location of the user computing device relative to the one or more street addresses and one or more landmarks. Further, the computing system can generate auditory indications that include announcements of the relative location of the one or more street addresses and/or one or more landmarks. For example, the computing system can announce when a street intersection or famous landmark (e.g., a statue of a famous artist) is nearby.

The computing system can generate one or more indications that can include a distance and/or orientation of the user device relative to the one or more street addresses or one or more landmarks. For example, the computing system can generate an auditory indication that the user device is north of a particular street or that a particular landmark is fifty meters away to the east of the user device.

The computing system can determine, based at least in part on the one or more segment signatures, one or more stored segment signatures respectively associated with one or more stored geographic locations that were previously traversed from the geographic location of the user device. For example, the computing system can access data including the one or more stored segment signatures and can determine the one or more stored segment signatures that are associated with stored geographic locations that are within a predetermined distance (e.g., fifty (50) meters) of the geographic location of the user device.

The computing system can generate a map of the geographic area that can include one or more indications associated with the one or more stored geographic locations that were previously traversed from the geographic location of the user device. For example, the computing system can generate a map that includes the geographic location of the user device marked in a first color (e.g., green) and the one or more stored geographic locations that were previously traversed marked in a second color (e.g., red).

The computing system can generate a visual representation that can include a contiguous set of the one or more stored geographic locations that were previously traversed from the geographic location of the user device. For example, the computing system can determine the one or more stored geographic locations that are contiguous (e.g., within a predetermined distance of one another). Further, the computing system can generate a visual representation in which a set of the one or more geographic locations that are contiguous is shown on a map of the geographic area within five (5) kilometers of the user device.

The computing system can determine an amount of ambient light associated with the surface of the environment. For example, the computing system can use one or more sensors (e.g., one or more cameras) that are proximate the surface (e.g., within twenty (20) centimeters of the surface) to detect the amount of ambient light around the surface.

Further, the computing system can adjust a brightness or intensity of light that is cast on the one or more segments. Adjusting the brightness or intensity of light can be based at least in part on the amount of ambient light. For example, the computing system can adjust the brightness of light cast by a light source (e.g., an LED bulb) that is proximate the surface to reach a predetermined brightness level. When the amount of ambient light is below the predetermined brightness level, the amount of light cast by the light source can be increased. When the amount of ambient light is above the predetermined brightness level, the amount of light cast by the light source can be decreased or shut off entirely.

The computing system can generate one or more new stored signatures based at least in part on the one or more segment signatures that do not match the one or more stored segment signatures. For example, the computing system can perform one or more operations including one or more comparisons of the one or more segment structures to the one or more stored segment signatures. Based at least in part on the one or more comparisons, the computing system can determine that the one or more segment structures that do not match the one or more stored segment signatures are new and can generate the one or more new stored segment signatures that include the one or more segment signatures that do not match the one or more stored segment signatures.

The computing system can determine, based at least in part on secondary geographic location data, one or more new geographic locations associated with the one or more new stored signatures. For example, the computing system can access secondary geographic location data that is based at least in part on data and/or information from a navigation device that can be used to determine the location of the user device (e.g., a GPS device). The secondary geographic location data can include information associated with the location of the user device including a latitude, longitude, and/or altitude of the user device.

The computing system can associate the one or more new geographic locations with the one or more new stored segment signatures. For example, the computing system can perform one or more operations to link the one or more new geographic locations to the corresponding one or more new stored segment signatures such that retrieving the one or more new stored segment signatures also retrieves the corresponding one or more new geographic locations.

The computing system can add the one or more new stored segment signatures to the one or more stored signatures. For example, the computing system can perform one or more operations to add the one or more new stored segment signatures to the one or more stored segment signatures that previously existed. In this way, the one or more stored segment signatures can be updated based on the one or more new geographic locations visited by the user device. In some embodiments, the computing system can add the one or more new stored segment signatures to a remote computing system on a periodic basis (e.g., weekly or daily) or whenever the remote computing system is accessible.

In some embodiments, the secondary geographic location data can be based at least in part on one or more localization operations that can include use of one or more global positioning system signals, one or more location beacons, or odometry. For example, the one or more localization operations can include accessing and/or receiving a GPS signal that includes the current location (e.g., latitude, longitude, and/or altitude) of the user device.

In some embodiments, the one or more stored signatures can be indexed using one or more spatial trees or one or more binary trees. Indexing the one or more stored signatures in one or more spatial trees can allow for faster search and retrieval of the associated one or more stored signatures that are indexed.

In some embodiments, the one or more stored segment signatures can be based at least in part on a historical average of one or more features associated with one or more stored segment signatures. The historical average can be associated with one or more stored segment signatures that are respectively associated with one or more stored segments of the same one or more geographic locations. For example, each of the one or more stored segment signatures can be associated with one or more features of one or more images of one or more stored segments (e.g., one or more images of the one or more stored segments of a surface of an environment that were captured at some time in the past) upon which the one or more stored segment signatures are based. The historical average of the one or more stored segment signatures can be generated and/or determined over a predetermined period of time (e.g., three (3) months or one (1) year from a particular start date to an end date) in the past. In some embodiments, the historical average of the one or more stored segment signatures can be generated and/or determined based on a period of time relative to a current time (e.g., the three (3) months prior to or including the current day).

As such, the historical average of the one or more features associated with the one or more stored segment signatures can account for variations in the appearance of the surface (e.g., the surface at a particular geographic location) over time (e.g., a ground surface and/or wall surface can become worn over time and can accumulate damage and other wear and tear as a result of being used). Accounting for variations in the appearance of the ground surface over time can result in one or more segment signatures that are more accurately matched to one or more corresponding stored segment signatures, despite variations in the appearance of the same surface over time. Using a historical average associated with the one or more features of the one or more stored segment signatures increases the probability of obtaining geolocation information even when an image associated with a segment signature does not exactly match the appearance of an image associated with a stored segment signature (due to variations). As such, the segment signature may still be matched with the correct corresponding stored segment signature.

In some embodiments, the one or more stored segment signatures can be generated based at least in part on the historical average associated with the one or more features of one or more stored segment signatures. For example, the one or more stored segment signatures can be updated when one or more new (e.g., one or more images that are more recent than the one or more images a stored segment signature is based on) images of a geographic location that is associated with one or more stored segment signatures are generated. The updated one or more stored segment signatures can be based on a set including the most recent segment signature that was generated and/or one or more previously generated stored signatures. By way of further example, the one or more stored segment signatures can be periodically updated (e.g., daily, monthly, quarterly, and/or annually) and the historical average can be associated with a predetermined period of time in the past (e.g., the last twelve (12) months or the last six (6) months).

In some embodiments, the user device can include a vehicle and/or a personal computing device. Further, the one or more sensors can be located on one or more portions of a vehicle. The one or more portions of the vehicle can include one or more bumpers of a vehicle, an undercarriage of the vehicle, an/or one or more side panels of the vehicle. Further, the one or more sensors can be located on a computing device (e.g., a personal computing device including a smartphone, a tablet computing device, and/or a laptop computing device) that includes one or more sensors on a front facing side (e.g., a selfie camera) of the computing device or a rear facing side of the computing device (e.g., a camera that is opposite the display of the computing device).

By way of example, the one or more sensors on an undercarriage of a vehicle (e.g., an automobile) can capture one or more images of a surface (e.g., ground surface below the vehicle). Further, one or more sensors on the side panels of a vehicle (e.g., on the driver doors and/or passenger doors of the vehicle) can capture one or more images of surfaces located to the side of the vehicle including walls, buildings, sidewalks, and/or curbs. Furthermore, one or more sensors located on smartphone can capture one or more images of a sidewalk, trail, parking lot, and/or other location that a pedestrian brings the smartphone.

In some embodiments, the user device can be associated with one or more satellites and/or one or more aircraft that capture one or more images of a surface (e.g., ground surface) of an environment. For example, the one or more images of one or more segments of the environment can be based at least in part on imagery captured by one or more aircraft and/or one or more satellites. The user device can be associated with one or more satellites that captures one or more images of a surface of an environment using one or more cameras that can focus on one or more segments of the environment at high resolution (e.g., a thirty (30) centimeter or smaller resolution), medium resolution (e.g., a ten (10) meter to thirty (30) meter resolution), and/or low resolution (e.g., fifty (50) meter or greater resolution).

The computing system can control one or more vehicle systems of a vehicle. Control of the vehicle can be based at least in part on the one or more indications. The one or more vehicle systems can include one or more motor systems, one or more steering systems, one or more notification systems, and/or one or more braking systems.

For example, the computing system can use information and/or data associated with the one or more indications (e.g., the current location of the vehicle) to operate a vehicle by guiding the vehicle based on its current location in relation to a destination. Further, the computing system can use the geographic location of the vehicle to avoid contact with an object along a route to a destination. In some embodiments, the vehicle can include an autonomous vehicle (e.g., an autonomous automobile, an autonomous boat, or an autonomous aircraft) that can operate without intervention from a human operator and can which be configured to travel to a destination safely.

In some embodiments, the vehicle can include a land-based vehicles, a water based vehicle, an amphibious vehicle, and/or an aircraft. The land-based vehicle can include a wheeled vehicle, a tracked vehicle, and/or a walking vehicle (e.g., a bipedal vehicle or quadrupedal vehicle) that can traverse the land. The water based vehicle can include a boat or a submersible. The amphibious vehicle can include a hovercraft. Further, the aircraft can include a fixed wing aircraft, a tilt wing aircraft, and/or a rotor-based aircraft (e.g., single rotor aircraft or multi-rotor aircraft) that can fly.

In some embodiments, the computing system can perform one or more noise reduction operations to filter surface detritus from the one or more images of the one or more segments. For example, the computing system can perform one or more noise reduction operations to filter leaves, pebbles, and/or other surface detritus from the one or more images. The surface detritus can include detritus that is of a more temporary nature and malleable nature (e.g., fallen leaves) in comparison to more long lasting surface features (e.g., the surface pattern of concrete).

The disclosed technology can include a computing system (e.g., a geolocation computing system) that is configured to perform various operations associated with geolocation based on matching segment signatures to stored segment signatures. Further, the computing system can be configured to generate, process, receive, and/or send information associated with geolocation information. In some embodiments, the geolocation computing system can be associated with various computing systems and/or devices that use, send, receive, and/or generate indications associated with geographic areas. Furthermore, the geolocation computing system can process, generate, modify, and/or access (e.g., send, and/or receive) data and/or information including sensor data and/or image data that are associated with a geographic area.

The computing system and/or computing device (e.g., a user device and/or a geolocation computing device) can include specialized hardware and/or software that enable the performance of one or more operations specific to the disclosed technology. The computing system and/or computing device can include one or more application specific integrated circuits that are configured to perform operations associated with receiving location request data associated with a request for a geographic location of a user device in an environment, accessing, based at least in part on the location request data, one or more images of one or more segments of a surface of the environment, generating one or more segment signatures based at least in part on the one or more images, determining the geographic location of the user device based at least in part on the one or more segment signatures that match one or more stored segment signatures respectively associated with one or more stored geographic locations, accessing map data including information associated with a geographic area, and generating one or more indications including information associated with the geographic location of the user device within the geographic area.

In some embodiments, any of the one or more operations performed by the disclosed technology (e.g., determining and/or generating the one or more segment signatures, determining a geographic location of a user device, and/or generating one or more indications associated with the geographic location of the user device) can be performed on-device (e.g., performed on the device itself with limited or no input or communication with external devices and/or systems) and/or in communication with one or more remote devices and/or one or more remote systems that can be configured to perform some portion of the one or more operations described herein.

By way of example, the geolocation computing system can be configured to control one or more vehicle systems of a vehicle based at least in part on the one or more indications including a latitude, longitude, and altitude of the vehicle. The one or more vehicle systems that are controlled can include vehicle guidance systems that are used to control the movement (e.g., direction and velocity) of the vehicle through an environment (e.g., a geographic area).

The systems, methods, devices, apparatuses, and tangible non-transitory computer-readable media of the disclosed technology can provide a variety of technical effects and benefits including an improvement in geolocation performance. In particular, the disclosed technology may provide benefits and advantages including an improvement in travel safety, greater geolocation accuracy, improved energy usage and reduced wear and tear by vehicles that use the geolocation information that is generated.

The disclosed technology can improve travel safety by providing more accurate geolocation information without the need for external signals including GPS or other signals from remote locations. As such, the disclosed technology can allow an individual or a vehicle the individual is travelling in (e.g., a manually operated vehicle or autonomous vehicle) to avoid potential hazards that can occur as a result of geolocation inaccuracies or an absence of geolocation information (e.g., when GPS signals are blocked by tall buildings). For example, by providing improved geolocation information that accurately represents the location of an object within a geographic area, the disclosed technology can reduce the probability that a vehicle will make unintended contact with an obstruction that is present in the environment in which the vehicle is travelling. Further, the improved geolocation information provided by the disclosed technology can be effectively used by autonomous vehicles. For example, the geolocation information provided by the disclosed technology can allow an autonomous vehicle to determine its location without resorting to external sources.

Further, the geolocation information generated by the disclosed technology can be used in conjunction with a secondary source of geolocation information to further improve the accuracy of the location of a device. For example, the disclosed technology can be used to provide a point of reference from which the position of a vehicle can be further refined using a secondary source of geolocation such as LiDAR.

Furthermore, the disclosed technology can improve the efficiency of resource consumption (e.g., fuel and/or electrical energy used by vehicles) by using more accurate geolocation information that allows for the generation of travel routes that are shorter. In general, vehicles that travel shorter routes will consume less energy in comparison to travelling along a longer route from the same starting location to the same destination. Further shorter travel routes can also result in less wear and tear on vehicles since the vehicles will have lower usage (e.g., fewer turns, less braking, and lower distance travelled) per trip. Less wear and tear can result in lower costs associated with the maintenance and upkeep of vehicles that travel the routes. Additionally, the disclosed technology can improve the efficiency of resource consumption of the computing device itself. On-device geolocation determination can reduce or obviate the need for communication with external devices (e.g., cellular base stations or GPS satellites), thereby reducing network resource consumption as well as power consumption by the computing device.

The disclosed technology can also be used to reduce the environmental impact (e.g., adverse environmental impact) on a geographic region by minimizing the distances travelled by vehicles that use the geolocation information to traverse an associated route. For example, the distance of a route can be positively correlated with the amount of vehicle exhaust, noise, and air pollution generated by a vehicle. Further, reducing travel time and/or the distance of a route can also reduce the amount of noise pollution (e.g., noise produced by the motors or engines of a vehicle following a route) and visual pollution (e.g., roads clogged with vehicle traffic) that a vehicle produces while traveling through a geographic area.

As such, the disclosed technology may provide the specific benefits of improved safety, reduced resource consumption, and reduced environmental impact. Further, any of the specific benefits provided to users can be used to improve the effectiveness of a wide variety of devices and services including the operation of vehicles (e.g., manually driven vehicles and/or autonomous vehicles) that use the geolocation information, routing services, delivery services, and/or mapping services. Accordingly, the improvements offered by the disclosed technology can result in tangible benefits to a variety of devices and/or systems including mechanical, electronic, computing systems, and/or computing devices associated with vehicle operation, geolocation, mapping, and/or navigation.

With reference now to FIGS. 1-10, example embodiments of the present disclosure will be discussed in further detail.

FIG. 1 depicts a diagram of an example system according to example embodiments of the present disclosure. The system 100 includes a computing device 102, a computing system 130, and/or a training computing system 150 that are communicatively connected and/or coupled over a network 180.

The computing device 102 can include one or more processors 112 and a memory 114. The one or more processors 112 can include any suitable processing device (e.g., a processor core, a microprocessor, an application specific integrated circuit (ASIC), a field programmable gate array (FPGA), a controller, and/or a microcontroller) and can be one processor or a plurality of processors that are operatively connected. The memory 114 can include one or more non-transitory computer-readable storage mediums, including RAM, NVRAM, ROM, EEPROM, EPROM, flash memory devices, magnetic disks, and combinations thereof. The memory 114 can store data 116 and instructions 118 which are executed by the processor 112 to cause the computing device 102 to perform one or more operations. In some embodiments, the data 116 can include: location request data that can include information associated with a request for the location of a user device (e.g., the computing device 102), segment signature data associated with one or more segment signatures and/or one or more stored segment signatures, sensor data that can include information associated with one or more images (e.g., images of one or more segments of a surface of an environment) from one or more sensors; secondary geographic location data associated with one or more indicators of the location of a device (e.g., the computing device 102) from one or more remote sources which can include GPS sources, and/or map data that can include information associated with one or more locations of one or more objects in a geographic area. In some embodiments, the computing device 102 can include any of the attributes and/or capabilities of the computing system 130 and can perform one or more operations including any of the operations performed by the computing system 130.

The computing device 102 can be implemented in and/or include any type of computing device, including, for example, a user device (e.g., a computing device configured to perform any operations described herein including one or more operations associated with determining the geographic location of the user device, a personal computing device (e.g., laptop computing device or desktop computing device), a mobile computing device (e.g., smartphone or tablet), a controller, a wearable computing device (e.g., a smart watch), and/or an embedded computing device.

Further, the computing device 102 can be configured to perform one or more operations including: receiving location request data associated with a request for a geographic location of a user device in an environment, accessing, based at least in part on the location request data, one or more images of one or more segments of a surface of the environment, generating one or more segment signatures based at least in part on the one or more images, determining the geographic location of the user device based at least in part on the one or more segment signatures that match one or more stored segment signatures respectively associated with one or more stored geographic locations, accessing map data including information associated with a geographic area, and generating one or more indications including information associated with the geographic location of the user device within the geographic area.

In some implementations, the computing device 102 can implement and/or include one or more machine-learned models 120. For example, the one or more machine-learned models 120 can include various machine-learned models including neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks, and/or other forms of neural networks. Examples of the one or more machine-learned models 120 are discussed with reference to FIGS. 1-10.

In some implementations, the one or more machine-learned models 120 can be received from the computing system 130 (e.g., a server computing system) over network 180, stored in the computing device memory 114, and then used or otherwise implemented by the one or more processors 112. In some implementations, the computing device 102 can implement multiple parallel instances of a single machine-learned model of the one or more machine learned models 120 (e.g., to determine one or more features of one or more images across multiple instances of the machine-learned model 120). More particularly, the one or more machine-learned models 120 can be configured and/or trained to perform any of the operations performed by the computing system 130.

Additionally, or alternatively, one or more machine-learned models 140 can be included in or otherwise stored and implemented by the computing system 130 that communicates with the computing device 102, for example, according to a client-server relationship. For example, the machine-learned models 140 can be implemented by the computing system 130 as a portion of a web service (e.g., user device location determination service). Thus, one or more machine-learned models 120 can be stored and implemented at the computing device 102 and/or one or more machine-learned models 140 can be stored and implemented at the computing system 130.

The computing device 102 can also include one or more of the user input component 122 that can receive user input. For example, the user input component 122 can be a touch-sensitive component (e.g., a touch-sensitive display screen or a touch pad) that is sensitive to the touch of a user input (e.g., a finger and/or a stylus). The touch-sensitive component can serve to implement a virtual keyboard. Other example user input components include a microphone, a mechanical keyboard, an electromechanical keyboard, and/or other means by which a user can provide user input.

The computing system 130 can include one or more processors 132 and a memory 134. The one or more processors 132 can include any suitable processing device (e.g., a processor core, a microprocessor, an ASIC, a FPGA, a controller, and/or a microcontroller) and can include one processor or a plurality of processors that are operatively connected. The memory 134 can include one or more non-transitory computer-readable storage mediums, including RAM, ROM, EEPROM, EPROM, flash memory devices, magnetic disks, and combinations thereof. The memory 134 can store data 136 and instructions 138 which are executed by the processor 132 to cause the computing system 130 to perform operations. In some embodiments, the data 136 can include: location request data, segment signature data, sensor data, secondary geographic location data, and/or map data.

Furthermore, in some embodiments, the computing system 130 can be configured to perform the operations of a server computing device including sending and/or receiving data including one or more indications associated with one or more geographic locations of a user device to and/or from one or more computing devices and/or computing systems including the computing device 102, and/or the training computing system 150. In some embodiments, the computing system 130 can include any of the attributes and/or capabilities of the computing device 102 and can perform one or more operations including any of the operations performed by the computing device 102.

Further, the computing system 130 can be implemented in and/or include any type of computing system, including, for example, a geolocation computing system (e.g., a computing system configured to perform any operations described herein. Further, the computing system 130 can include and/or communicate with a personal computing device (e.g., laptop computing device or desktop computing device), a mobile computing device (e.g., smartphone or tablet), a server computing system (e.g., a computing system configured to provide data including sensor data and/or map data), and/or a controller.

Furthermore, the server computing system 130 can be configured to perform image content analysis on one or more inputs (e.g., the one or more images) that are provided to the server computing system 130. For example, the server computing system 130 can receive data, via the network 180. The data can include image data that includes one or more images and/or associated metadata (e.g., the location (e.g., latitude, longitude, and/or latitude) at which the image was captured). The server computing system 130 can then perform various operations, which can include the use of the one or more machine-learned models 140, to detect one or more features of the one or more images.

By way of further example, the server computing system 130 can use object detection and/or object recognition techniques to detect the position and/or location of one or more features of one or more objects in an image (e.g., one or more segments of a surface of an environment) based at least in part on recognition of the one or more objects. In another example, the server computing system 130 can receive data from one or more remote computing systems (e.g., the computing device 102) which can include one or more images that have been associated with metadata. The data received by the server computing system 130 can then be stored (e.g., stored in an image repository) for later use by the computing system 130.

In some implementations, the computing system 130 includes and/or is otherwise implemented by one or more server computing devices. In instances in which the computing system 130 includes plural server computing devices, such server computing devices can operate according to sequential computing architectures, parallel computing architectures, or some combination thereof.

As described above, the computing system 130 can store or otherwise include the one or more machine-learned models 140. For example, the one or more machine-learned models 140 can include various machine-learned models. Example machine-learned models include neural networks or other multi-layer non-linear models. Example neural networks include feed forward neural networks, deep neural networks, recurrent neural networks, and convolutional neural networks. Examples of the one or more machine-learned models 140 are discussed with reference to FIGS. 1-10.

The computing device 102 and/or the computing system 130 can train the one or more machine-learned models 120 and/or 140 via interaction with the training computing system 150 that is communicatively connected and/or coupled over the network 180. The training computing system 150 can be separate from the computing system 130 or can be a portion of the computing system 130.

The training computing system 150 includes one or more processors 152 and a memory 154. The one or more processors 152 can be any suitable processing device (e.g., a processor core, a microprocessor, an ASIC, a FPGA, a controller, and/or a microcontroller) and can be one processor or a plurality of processors that are operatively connected. The memory 154 can include one or more non-transitory computer-readable storage mediums, including RAM, ROM, EEPROM, EPROM, flash memory devices, magnetic disks, and combinations thereof. The memory 154 can store data 156 and instructions 158 which are executed by the processor 152 to cause the training computing system 150 to perform operations. In some embodiments, the data 156 can include sensor data and/or map data. In some implementations, the training computing system 150 includes or is otherwise implemented by one or more server computing devices.

The training computing system 150 can include a model trainer 160 that trains the one or more machine-learned models 120 and/or the one or more machine-learned models 140 respectively stored at the computing device 102 and/or the computing system 130 using various training or learning techniques, including, for example, backwards propagation of errors. In some implementations, performing backwards propagation of errors can include performing truncated backpropagation through time. The model trainer 160 can perform a number of generalization techniques (e.g., weight decays and/or dropouts) to improve the generalization capability of the models being trained.

In particular, the model trainer 160 can train the one or more machine-learned models 120 and/or the one or more machine-learned models 140 based on a set of training data 162. The training data 162 can include, for example, any sensor data and/or map data. For example, the training data can include one or more images associated with a geographic area. The one or more machine-learned models 120 and/or the one or more machine-learned models 140 can be configured and/or trained to perform any of the one or more operations performed by the computing device 102 and/or the computing system 130. For example, the one or more machine-learned models 120 can be configured and/or trained to perform various operations including detecting one or more features of one or more images of one or more segments of a surface of an environment.

In some implementations, if the user has provided consent, the training examples can be provided by the computing device 102. Thus, in such implementations, the one or more machine-learned models 120 provided to the computing device 102 can be trained by the training computing system 150 based at least in part on user-specific data received from the computing device 102. In some instances, this process can be referred to as personalizing the model.

The model trainer 160 can include computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium including RAM hard disk or optical or magnetic media.

The network 180 can include any type of communications network, including a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 1 illustrates an example computing system that can be used to implement the present disclosure. Other computing systems can be used as well. For example, in some implementations, the computing device 102 and/or the computing system 130 can include the model trainer 160 and the training data 162. In such implementations, the one or more machine-learned models 120 can be both trained and used locally at the computing device 102 and/or the computing system 130. In some such implementations, the computing device 102 and/or the computing system 130 can implement the model trainer 160 to personalize the one or more machine-learned models 120 based on user-specific data.

Figure 2:
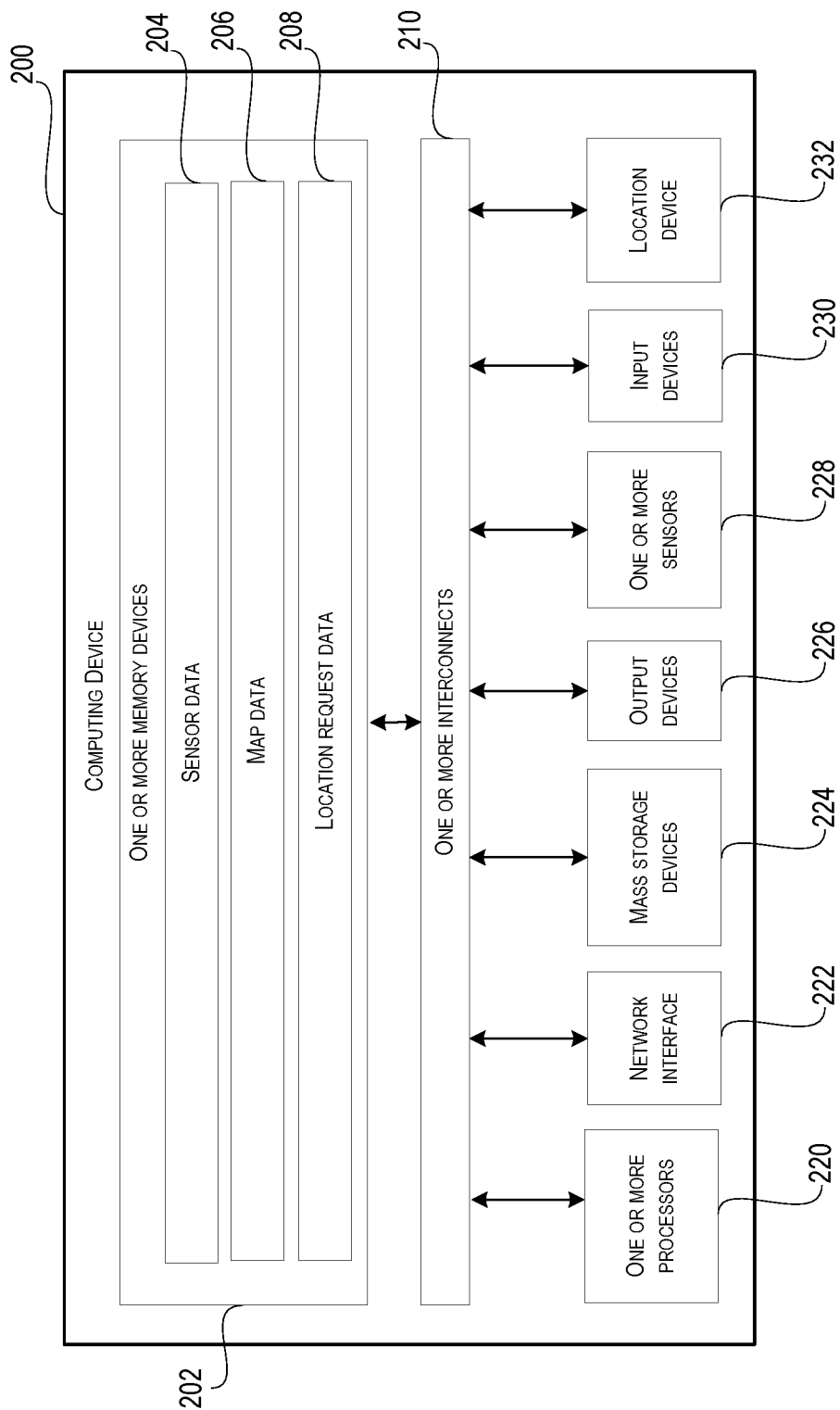
FIG. 2 depicts a diagram of an example device according to example embodiments of the present disclosure.

FIG. 2 depicts a diagram of an example device according to example embodiments of the present disclosure. A computing device 200 can include one or more attributes and/or capabilities of the computing device 102, the computing system 130, and/or the training computing system 150. Furthermore, the computing device 200 can perform one or more actions and/or operations including the one or more actions and/or operations performed by the computing device 102, the computing system 130, and/or the training computing system 150, which are depicted in FIG. 1.

As shown in FIG. 2, the computing device 200 can include one or more memory devices 202, sensor data 204, map data 206, location request data 208, one or more interconnects 210, one or more processors 220, a network interface 222, one or more mass storage devices 224, one or more output devices 226, one or more sensors 228, one or more input devices 230, and/or the location device 232.

The one or more memory devices 202 can store information and/or data (e.g., the sensor data 204, the map data 206, and/or the location request data 208). Further, the one or more memory devices 202 can include one or more non-transitory computer-readable storage mediums, including RAM, ROM, EEPROM, EPROM, flash memory devices, magnetic disks, and combinations thereof. The information and/or data stored by the one or more memory devices 202 can be executed by the one or more processors 220 to cause the computing device 200 to perform operations.

The sensor data 204 can include one or more portions of data (e.g., the data 116, the data 136, and/or the data 156 which are depicted in FIG. 1) and/or instructions (e.g., the instructions 118, the instructions 138, and/or the instructions 158 which are depicted in FIG. 1) that are stored in the memory 114, the memory 134, the memory 154, and/or the memory 174 respectively. Furthermore, the sensor data 204 can include information associated with one or more images that were generated by one or more sensors (e.g., one or more cameras). Further, the sensor data 204 can be associated with the state of one or more objects in a geographic area. In some embodiments, the sensor data 204 can be received from one or more computing systems (e.g., the computing system 130 that is depicted in FIG. 1).

The map data 206 can include one or more portions of the data 116, the data 136, and/or the data 156 which are depicted in FIG. 1 and/or instructions (e.g., the instructions 118, the instructions 138, and/or the instructions 158 which are depicted in FIG. 1) that are stored in the memory 114, the memory 134, the memory 154, and/or the memory 174 respectively. Furthermore, the map data 206 can include information associated with one or more locations in a geographic area. Furthermore, the map data 206 can also include information associated with one or more objects (e.g., streets and/or landmarks) that are located within the geographic area. In some embodiments, the map data 206 can be received from one or more computing systems (e.g., the computing system 130 that is depicted in FIG. 1).

The location request data 208 can include one or more portions of the data 116, the data 136, and/or the data 156 which are depicted in FIG. 1 and/or instructions (e.g., the instructions 118, the instructions 138, and/or the instructions 158 which are depicted in FIG. 1) that are stored in the memory 114, the memory 134, the memory 154, and/or the memory 174 respectively. Furthermore, the location request data 208 can include information associated with a request for a location of a user device in an environment. Furthermore, the location request data 208 can also include information associated with a user device and/or one or more vehicles that will be used to travel through the geographic area. For example, the user device can include a smartphone and the one or more vehicles can include manually operated and/or autonomous vehicles that are in communication with the user device and which can be configured to be controlled by the user device. In some embodiments, the location request data 208 can be received from one or more computing systems (e.g., the computing system 130 that is depicted in FIG. 1).

The one or more interconnects 210 can include one or more interconnects or buses that can be used to send and/or receive one or more signals (e.g., electronic signals) and/or data (e.g., the sensor data 204, the map data 206, and/or the location request data 208) between components of the computing device 200, including the one or more memory devices 202, the one or more processors 220, the network interface 222, the one or more mass storage devices 224, the one or more output devices 226, the one or more sensors 228 (e.g., a sensor array), and/or the one or more input devices 230. The one or more interconnects 210 can be arranged or configured in different ways including as parallel or serial connections. Further the one or more interconnects 210 can include one or more internal buses to connect the internal components of the computing device 200; and one or more external buses used to connect the internal components of the computing device 200 to one or more external devices. By way of example, the one or more interconnects 210 can include different interfaces including Industry Standard Architecture (ISA), Extended ISA, Peripheral Components Interconnect (PCI), PCI Express, Serial AT Attachment (SATA), HyperTransport (HT), USB (Universal Serial Bus), Thunderbolt, IEEE 1394 interface (FireWire), and/or other interfaces that can be used to connect components.

The one or more processors 220 can include one or more computer processors that are configured to execute the one or more instructions stored in the one or more memory devices 202. For example, the one or more processors 220 can, for example, include one or more general purpose central processing units (CPUs), application specific integrated circuits (ASICs), and/or one or more graphics processing units (GPUs). Further, the one or more processors 220 can perform one or more actions and/or operations including one or more actions and/or operations associated with the sensor data 204, the map data 206, and/or the location request data 208. The one or more processors 220 can include single or multiple core devices including a microprocessor, microcontroller, integrated circuit, and/or logic device.

The network interface 222 can support network communications. For example, the network interface 222 can support communication via networks including a local area network and/or a wide area network (e.g., the Internet). The one or more mass storage devices 224 (e.g., a hard disk drive and/or a solid state drive) can be used to store data including the sensor data 204, the map data 206, and/or the location request data 208. The one or more output devices 226 can include one or more display devices (e.g., LCD display, OLED display, and/or CRT display), one or more light sources (e.g., LEDs), one or more loudspeakers, and/or one or more haptic output devices.

The one or more input devices 230 can include one or more keyboards, one or more touch sensitive devices (e.g., a touch screen display), one or more buttons (e.g., ON/OFF buttons and/or YES/NO buttons), one or more microphones, and/or one or more cameras.

The one or more memory devices 202 and the one or more mass storage devices 224 are illustrated separately, however, the one or more memory devices 202 and the one or more mass storage devices 224 can be regions within the same memory module. The computing device 200 can include one or more additional processors, memory devices, network interfaces, which may be provided separately or on the same chip or board. The one or more memory devices 202 and the one or more mass storage devices 224 can include one or more computer-readable media, including, but not limited to, non-transitory computer-readable media, RAM, ROM, hard drives, flash drives, and/or other memory devices.

The one or more memory devices 202 can store sets of instructions for applications including an operating system that can be associated with various software applications or data. The one or more memory devices 202 can be used to operate various applications including a mobile operating system developed specifically for mobile devices. As such, the one or more memory devices 202 can store instructions that allow the software applications to access data including wireless network parameters (e.g., identity of the wireless network, quality of service), and invoke various services including telephony, location determination (e.g., via global positioning system (GPS) or WLAN), and/or wireless network data call origination services. In other embodiments, the one or more memory devices 202 can be used to operate or execute a general-purpose operating system that operates on both mobile and stationary devices, such as smartphones and desktop computers, for example.

The software applications that can be operated or executed by the computing device 200 can include applications associated with the system 100 shown in FIG. 1. Further, the software applications that can be operated and/or executed by the computing device 200 can include native applications and/or web-based applications.

The location device 232 can include one or more devices or circuitry for determining the location and/or position of the computing device 200. For example, the location device 232 can determine an actual (e.g., a latitude, longitude, and/or altitude) and/or relative (e.g., a position of the computing device 200 relative to some point of reference with a previously determined location and/or position) location and/or position of the computing device 200 by using a satellite navigation positioning system (e.g. a GPS system, a Galileo positioning system, the GLObal Navigation satellite system (GLONASS), the BeiDou Satellite Navigation and Positioning system), an inertial navigation system, a dead reckoning system, based on IP address, by using triangulation and/or proximity to cellular towers or Wi-Fi hotspots, beacons, and the like and/or other suitable techniques for determining position. Further, the location device 232 can include one or more devices and/or circuitry for determining the location of the computing device 200 based at least in part on the techniques described herein (e.g., using images of a surface to determine the location of the computing device 200).

Figure 3:
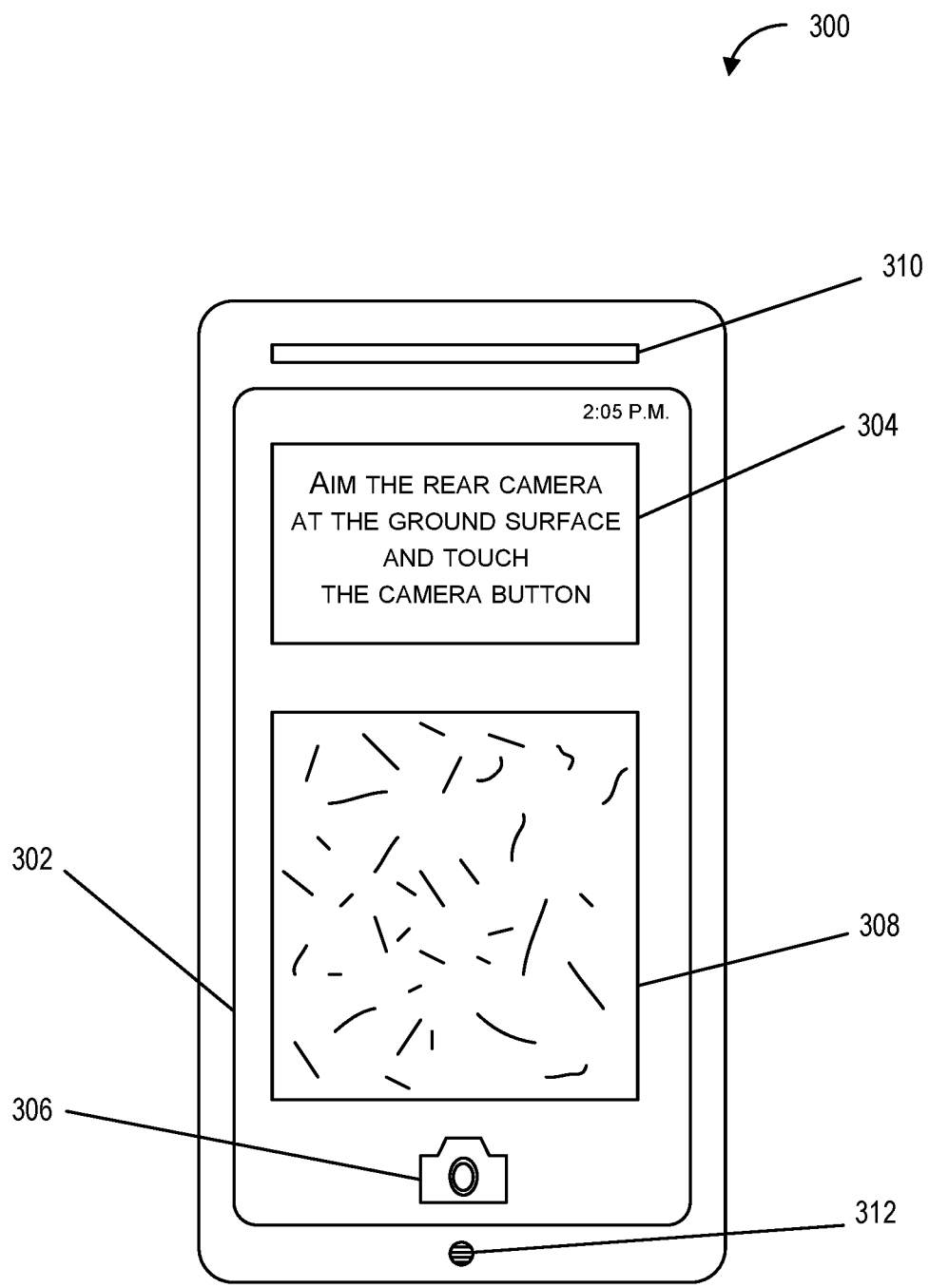
FIG. 3 depicts a geolocation user interface according to example embodiments of the present disclosure.

FIG. 3 depicts a geolocation user interface according to example embodiments of the present disclosure. A user computing device 300 can include one or more attributes and/or capabilities of the computing device 102, the computing device 200, the computing system 130, the training computing system 150, and/or the one or more remote computing systems 170. Furthermore, the navigation computing device 300 can perform one or more actions and/or operations including the one or more actions and/or operations performed by the computing device 102, the computing system 130, the training computing system 150, and/or the one or more remote computing systems 170, which are depicted in FIG. 1. As shown in FIG. 3, the user computing device 300 includes a display component 302, an interface element 304, an interface element 306, a surface image 308, an audio output 310, and an audio input 312.

The user computing device 300 (e.g., a user device) can be configured to receive data and/or information including location request data, segment signature data, sensor data, secondary geographic location data, and/or map data. For example, the user computing device 300 can include a personal computing device (e.g., a smartphone) or an in-vehicle navigation system that can receive one or more wireless signals that can include secondary geographic location data for a user of the user computing device 300.

As shown, the user computing device 300 includes a display component 302 that can display imagery including one or more indications, one or more pictures (e.g. one or more image of a ground surface), and/or one or more graphics. Further, the display component 302 can be configured to detect interactions (e.g., interactions by a user of the user device 300) with the display component 302. For example, the display component 302 can detect interaction using one or more sensors including one or more capacitive sensors, one or more resistive sensors, one or more light sensors, one or more pressure sensors, and/or one or more acoustic sensors. By way of further example, the display component can be a touch sensitive display that can detect one or more touches by a user of the user computing device 300.

In this example, the user computing device 300 is configured to determine the location of the user computing device 300 (e.g., by generating a segment signature based on an image captured by a camera of the user computing device 300) after receiving location request data (e.g., location request data based on a user interaction with the user computing device 300). Further, the user computing device 300 can receive secondary geographic location data from a remote computing system (e.g., a server computing system that has the capabilities and/or attributes of the computing system 130 and that is configured to send and/or receive one or more signals associated with the geographic location of a device).

Based on the location request data, the user computing device 300 can perform one or more operations associated with determining the geographic location of the user computing device 300. As shown, the user computing device 300 has activated an application that generates the interface element 304 which is an indication asking the user to "AIM THE REAR CAMERA AT THE GROUND SURFACE AND TOUCH THE CAMERA BUTTON." The computing device also generates the interface element 306 which is depicted as an icon of a camera and is an interface control that causes a camera (not shown) on the rear of the user computing device 300 to capture the surface image represented in the interface element 308 that is generated on the display 302 of the user computing device 300.

The interface element 308 can include a representation of one or more segments of a ground surface that are in the field of view of the rear camera of the user computing device 300. In other embodiments, other types of surfaces (e.g., wall surfaces) can be represented in the interface element 308. When the user touches the interface element 306 (e.g., tapping the interface element 306 with a finger), a camera (e.g., the rear camera of the user computing device 300) can capture one or more images of the ground surface of the environment that is the field of view of the camera of the user computing device 300. The user computing device 300 can then use the one or more images to generate one or more segment signatures that can be used to determine the geographic location of the user computing device 300.

In some embodiments, the user computing device 300 can use the audio output 310 (e.g., a loudspeaker) to generate one or more audible indications. For example, the audio output 310 can generate a synthetic voice that generates an indication based on the interface element 306 (to aim the camera at the ground surface and press the camera button). Further, the audio output 310 can provide an audible indication when an operation has been performed. For example, the audio output 310 can generate a clicking sound when the interface element 306 is touched by a user.

Further, the user computing device 300 can include the audio input 312 (e.g., a microphone) which can be configured to detect one or more sounds including one or more words spoken by a user of the user computing device 300. Further, the audio input 312 can be configured to detect user commands such as a request for the location of the user device 300. For example, the user computing device 300 can generate the location request data based at least in part on a user's spoken command to "PROVIDE MY CURRENT LOCATION." Further, the user computing device 300 can capture the one or more images of the ground surface based on a user's spoken command to "SNAP A PHOTO."

Figure 4:
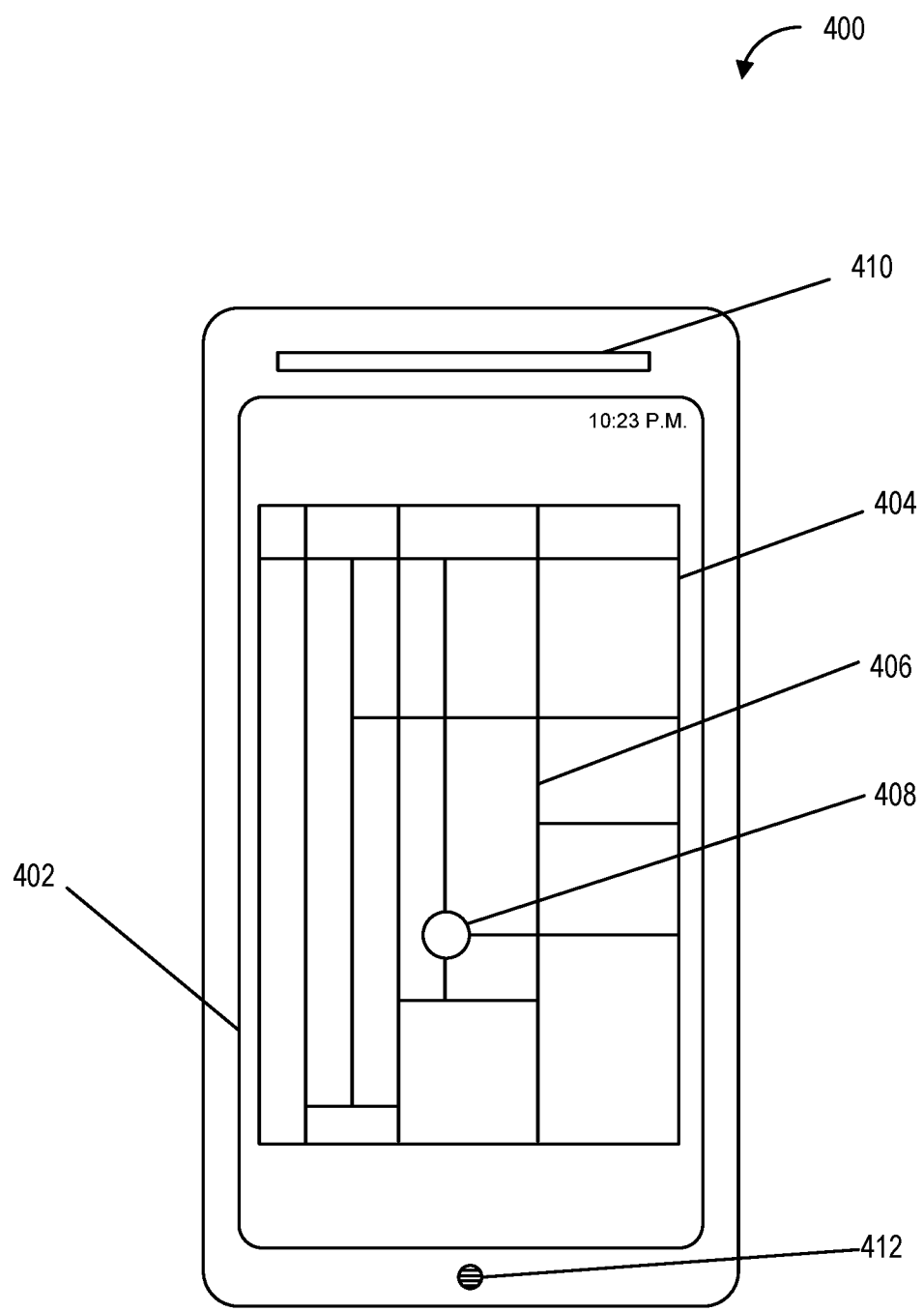
FIG. 4 depicts a geolocation user interface according to example embodiments of the present disclosure.

FIG. 4 depicts a geolocation user interface according to example embodiments of the present disclosure. A user computing device 400 can include one or more attributes and/or capabilities of the computing device 102, the computing device 200, the computing system 130, the training computing system 150, and/or the one or more remote computing systems 170. Furthermore, the navigation computing device 400 can perform one or more actions and/or operations including the one or more actions and/or operations performed by the computing device 102, the computing system 130, the training computing system 150, and/or the one or more remote computing systems 170, which are depicted in FIG. 1. As shown in FIG. 4, the user computing device 400 includes a display component 402, an interface element 404, an interface element 406, an interface element 408, an audio output 410, and an audio input 412.

The user computing device 400 (e.g., a user device) can be configured to receive data and/or information including location request data, segment signature data, sensor data, secondary geographic location data, and/or map data. For example, the user computing device 400 can include a personal computing device (e.g., a smartphone) or an in-vehicle navigation system that can receive one or more wireless signals that can include secondary geographic location data for a user of the user computing device 400.

As shown, the user computing device 400 includes a display component 402 that can display imagery including one or more indications, one or more pictures (e.g. one or more image of a surface), and/or one or more graphics. The one or more indications can include, for example, a map of a geographic area in which the user computing device 400 is located. Further, the display component 402 can be configured to detect interactions (e.g., interactions by a user of the user device 400) with the display component 402. For example, the display component 402 can detect interaction using one or more sensors including one or more capacitive sensors, one or more resistive sensors, one or more light sensors, one or more pressure sensors, and/or one or more acoustic sensors. By way of further example, the display component can be a touch sensitive display that can detect one or more touches by a user of the user computing device 400.

In this example, the user computing device 400 has determined the geographic location of the user computing device 400 (e.g., by generating a segment signature based on an image captured by a sensor (a camera) of the user computing device 400) after receiving location request data (e.g., location request data based on a user interaction with the display 402 of the user computing device 400). Further, the user computing device 400 can receive secondary geographic location data from a remote computing system (e.g., a server computing system that has the capabilities and/or attributes of the computing system 130 and that is configured to send and/or receive one or more signals associated with the geographic location of a device).

Based on the location request data, the user computing device 400 can perform one or more operations associated with determining the geographic location of the user computing device 400. As shown, the user computing device 400 has activated an application (e.g., a map application) that generates the interface element 404 which is a visual representation of the geographic area within which the user computing device 400 is located. The interface element 404 can include a map of the geographic area in which the user computing device 400 is located. Further, the map of the geographic area can be locally stored in a memory device of the user computing device 400 and can be accessed without the need for communication with a remote computing device. Storing the map of the geographic area locally can be particularly advantageous since accessing the map does not rely on external communication, the map can be provided even if there is poor connectivity (e.g., in built-up cities with high rise buildings and/or in remote areas with limited wireless signal availability). Further, in some embodiments, the user computing device 400 can periodically, or when a remote computing device (e.g., a geographic information system server) is detected, update the map data that is stored on the computing device 400.

The interface element 404 includes the interface element 406, which indicates a street within the visual representation of the geographic area. The interface element 406 can include street names, street numbers, and/or can be colored to distinguish a street from nearby buildings and/or other objects. Further, the interface element 404 includes the interface element 408 which indicates the location of the user computing device 400 within the geographic area. The interface element 408 can be depicted in various ways and can in some embodiments be associated with the appearance and/or type of the user computing device 400. For example, if the user computing device 400 is a vehicle or associated with a vehicle (e.g., a driver of a vehicle that is using the user computing device 400 for navigation), the interface element 408 can be depicted as an icon of a vehicle (e.g., an automobile). By way of further example, if the user computing device 400 is being used by a user on foot, the interface element 408 can be depicted as an icon of a person.

In some embodiments, the user computing device 400 can use the audio output 410 (e.g., a loudspeaker) to generate one or more audible indications associated with the visual representation of the geographic area in which the user computing device 400 is located. For example, the audio output 410 can generate a synthetic voice that announces the addresses of nearby streets and/or the names of nearby landmarks.

Further, the user computing device 400 can include the audio input 412 (e.g., a microphone) that can be configured to detect one or more sounds including one or more words spoken by a user of the user computing device 400. The audio input 412 can be configured to detect user commands such as a request for a map of the geographic area in which the user device 400 is located. For example, the user computing device 400 can generate the location request data based at least in part on a user's spoken command to "SHOW ME A MAP OF THE AREA." Further, the user computing device 400 can refresh the map based on the current geographic location of the user computing device 400 by issuing the spoken command to "REFRESH THE MAP."

Figure 5:
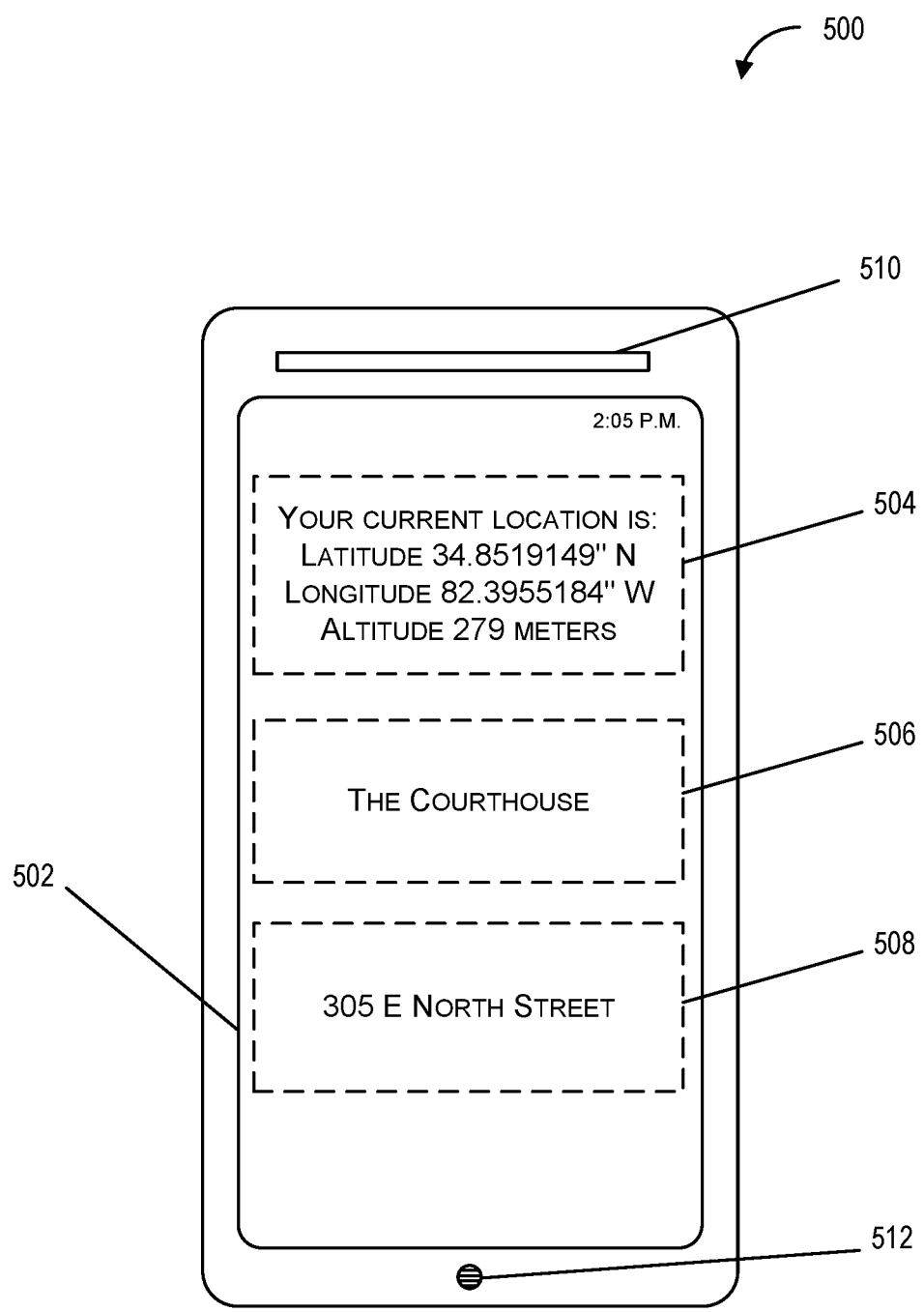
FIG. 5 depicts a geolocation user interface according to example embodiments of the present disclosure.

FIG. 5 depicts a geolocation user interface according to example embodiments of the present disclosure. A user computing device 500 can include one or more attributes and/or capabilities of the computing device 102, the computing device 200, the computing system 130, the training computing system 150, and/or the one or more remote computing systems 170. Furthermore, the navigation computing device 500 can perform one or more actions and/or operations including the one or more actions and/or operations performed by the computing device 102, the computing system 130, the training computing system 150, and/or the one or more remote computing systems 170, which are depicted in FIG. 1. As shown in FIG. 5, the user computing device 500 includes a display component 502, an interface element 504, an interface element 506, an interface element 508, an audio output 510, and an audio input 512.

The user computing device 500 (e.g., a user device) can be configured to receive data and/or information including location request data, segment signature data, sensor data, secondary geographic location data, and/or map data. For example, the user computing device 500 can include a personal computing device (e.g., a smartphone) or an in-vehicle navigation system that can receive one or more wireless signals that can include secondary geographic location data for a user of the user computing device 500.

As shown, the user computing device 500 includes a display component 502 that can display imagery including one or more indications, one or more pictures (e.g. one or more image of a surface), and/or one or more graphics. Further, the display component 502 can be configured to detect interactions (e.g., interactions by a user of the user device 500) with the display component 502. For example, the display component 502 can detect interaction using one or more sensors including one or more capacitive sensors, one or more resistive sensors, one or more light sensors, one or more pressure sensors, and/or one or more acoustic sensors. By way of further example, the display component can be a touch sensitive display that can detect one or more touches by a user of the user computing device 500.

In this example, the user computing device 500 is configured to determine the location of the user computing device 500 (e.g., by generating a segment signature based on an image captured by a camera of the user computing device 500) after receiving location request data (e.g., location request data based on a user interaction with the user computing device 500). Further, the user computing device 500 can receive secondary geographic location data from a remote computing system (e.g., a server computing system that has the capabilities and/or attributes of the computing system 130 and that is configured to send and/or receive one or more signals associated with the geographic location of a device).

Based on the location request data, the user computing device 500 can perform one or more operations associated with determining the geographic location of the user computing device 500. As shown, the user computing device 500 has activated an application that generates the interface element 504, the interface element 506, and/or the interface element 508. To generate the interface elements 504/506/508, the user computing device 500 can access map data that is stored locally on the user computing device 500. Based at least in part on the map data, the user computing device can determine nearby addresses and/or landmarks that are within the predetermined distance of the user computing device 500.

As shown, the user computing device 500 generates the interface element 504, which is an indication that provides the user's current latitude, longitude, and altitude. The user computing device 500 also generates the interface element 506, which is an indication of a landmark (e.g., the courthouse) that is within a predetermined distance of the user computing device 500. Furthermore, the user computing device 500 can generate the interface element 508, which indicates a street address (including a street name and number) that is within the predetermined distance of the user computing device 500.

In some embodiments, the user computing device 500 can use the audio output 510 (e.g., a loudspeaker) to generate one or more audible indications. For example, the audio output 510 can generate a synthetic voice that announces the contents of the interface element 504 (e.g., indications of the latitude, longitude, and altitude of the user computing device 500), the interface element 506 (e.g., "COURTHOUSE), and the interface element 508 (e.g., "305 E NORTH STREET"). In some embodiments, the user computing device 500 can announce the content of the interface element 504, the interface element 506, and/or the interface element 508 based on a user interaction (e.g., a user's touch) with the element 504, the interface element 506, and/or the interface element 508 respectively.

Further, the user computing device 500 can include the audio input 512 (e.g., a microphone) which can be configured to detect one or more sounds including one or more words spoken by a user of the user computing device 500. The audio input 512 can be configured to detect user commands such as a request for a landmark that is near the location of the user device 500. For example, the user computing device 500 can generate the location request data based at least in part on a user's spoken command to "PROVIDE THE NEAREST LANDMARK AND THE ADDRESS OF THE LANDMARK." In response the user computing device 500 can provide the interface element 504, the interface element 506, and/or the interface element 508.

Figure 6:
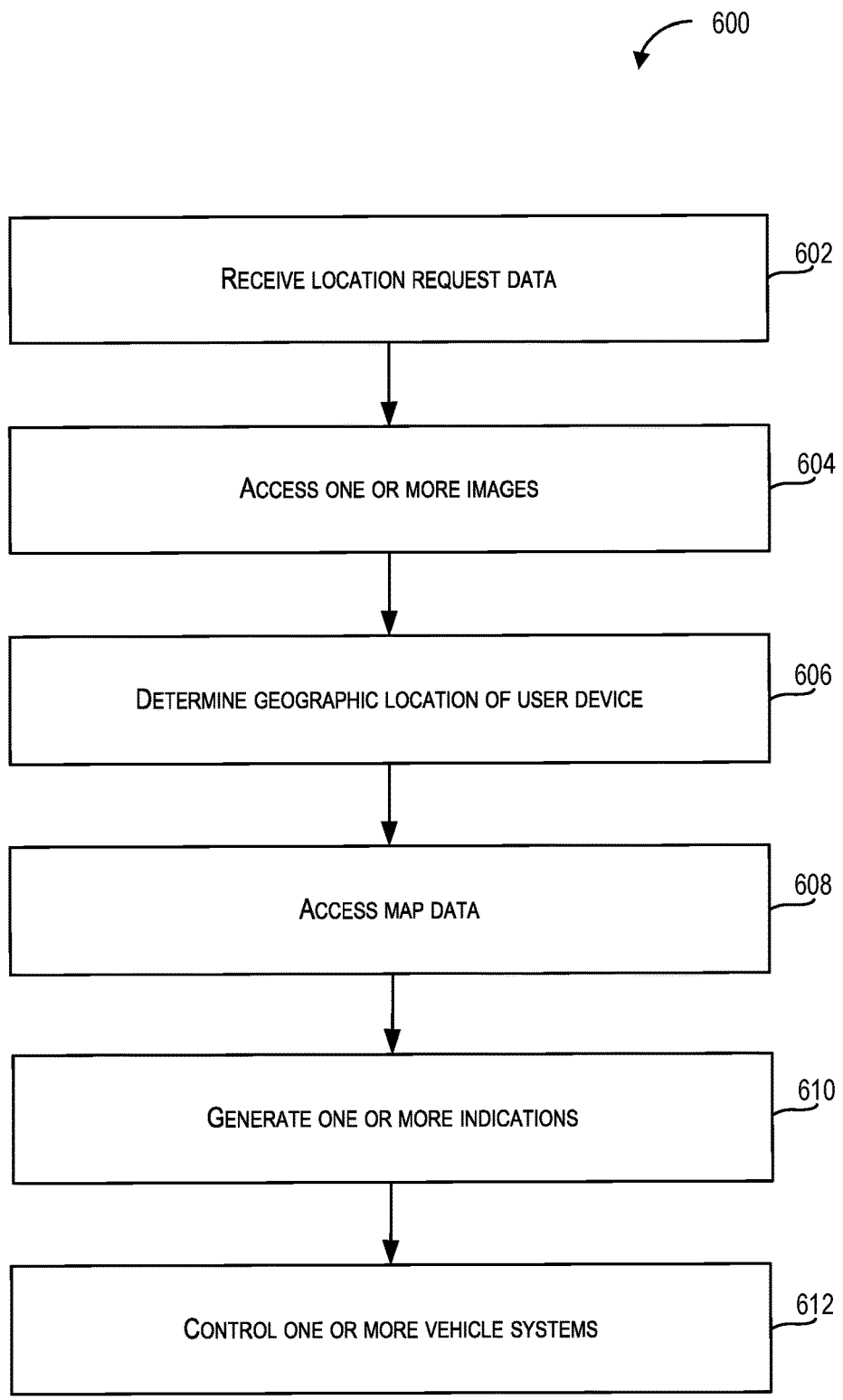
FIG. 6 depicts a flow diagram of surface detection and geolocation according to example embodiments of the present disclosure.

FIG. 6 depicts a flow diagram of surface detection and geolocation according to example embodiments of the present disclosure. One or more portions of the method 600 can be executed and/or implemented on one or more computing devices or computing systems including, for example, the computing device 102, the computing system 130, the training computing system 150, and/or the computing device 200. Further, one or more portions of the method 600 can be executed or implemented as an algorithm on the hardware devices or systems disclosed herein. FIG. 6 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At 602, the method 600 can include receiving, accessing, obtaining, and/or retrieving location request data associated with a request for a geographic location of a user device in an environment. For example, in response to a user interaction (e.g., a spoken request, a touch interaction with a user interface), the computing device 102 (e.g., a user computing device) can receive location request data that is associated with a user's request for the location of the computing device 102. In some embodiments, the computing device 102 can periodically generate the location request data in order to periodically determine the geographic location of the computing device 102 (e.g. the location request data can be generated without the need for an explicit request from a user).

At 604, the method 600 can include accessing, based at least in part on the location request data, one or more images of one or more segments of a surface of the environment. For example, based on receiving the location request data, the computing device 102 can capture one or more images using one or more sensors (e.g., a camera) of the computing device 102. By way of further example, the computing device 102 can access one or more images of one or more segments of the surface of the environment that were previously captured by the one or more sensors of the computing device 102.

At 606, the method 600 can include determining a geographic location of the user device. The geographic location of the user device can be determined based at least in part on the one or more segment signatures that match one or more stored segment signatures respectively associated with one or more stored geographic locations. For example, the computing device 102 can use a hash function and a hash table to determine the one or more segment signatures that match the one or more stored segment signatures.

The one or more segment signatures can be based at least in part on the one or more images of the one or more segments of the surface of the environment. For example, the computing device 102 can generate one or more segment signatures based at least in part on the one or more images of the one or more segments of the surface of the environment. For example, the computing device 102 can perform one or more operations on the one or more images. The one or more operations performed on the one or more images can include feature detection, feature recognition, and/or feature extraction operations which can be used to generate the one or more segment signatures that can uniquely identify each of the one or more segments of the surface of the environment that are depicted in the one or more images.

At 608, the method 600 can include accessing map data. The map data can include data and/or information associated with a geographic area. For example, the computing device 102 can access locally stored map data that includes a map of a geographic area (e.g., a city, state, or province).

At 610, the method 600 can include generating one or more indications. The one or more indications can include and/or be associated with data and/or information associated with the geographic location of the user device within the geographic area. For example, the computing device 102 can generate a map of the geographic area that includes an indication of the geographic location of the computing device 102 within the geographic area. Accordingly, the geographic location of a user computing device can be provided to the user of the user computing device and that geographic location can be determined without the need for an external signal (e.g., GPS and/or cellular signal). The geographic location can be determined based at least in part on one or more comparisons of one or more segment signatures to one or more stored segment signatures in which the one or more segment signatures are based at least in part on one or more images of the environment captured by the computing device. The one or more images can be captured and the one or more comparison can be made by the computing device such that the geolocation determination occurs on-device (e.g., without the need for external communication).

At 612, the method 600 can include controlling one or more vehicle systems of a vehicle. The vehicle can include a manually operated vehicle, an autonomous vehicle, and/or a semi-autonomous vehicle that can be in communication with and/or controlled by the user device. The vehicle can be controlled based at least in part on the one or more indications. The one or more vehicle systems can include one or more motor systems, one or more steering systems, one or more notification systems, and/or one or more braking systems. For example, the computing device 102 can communicate with the vehicle and cause the vehicle to generate a notification including the geographic location of the computing device 102.

Figure 7:
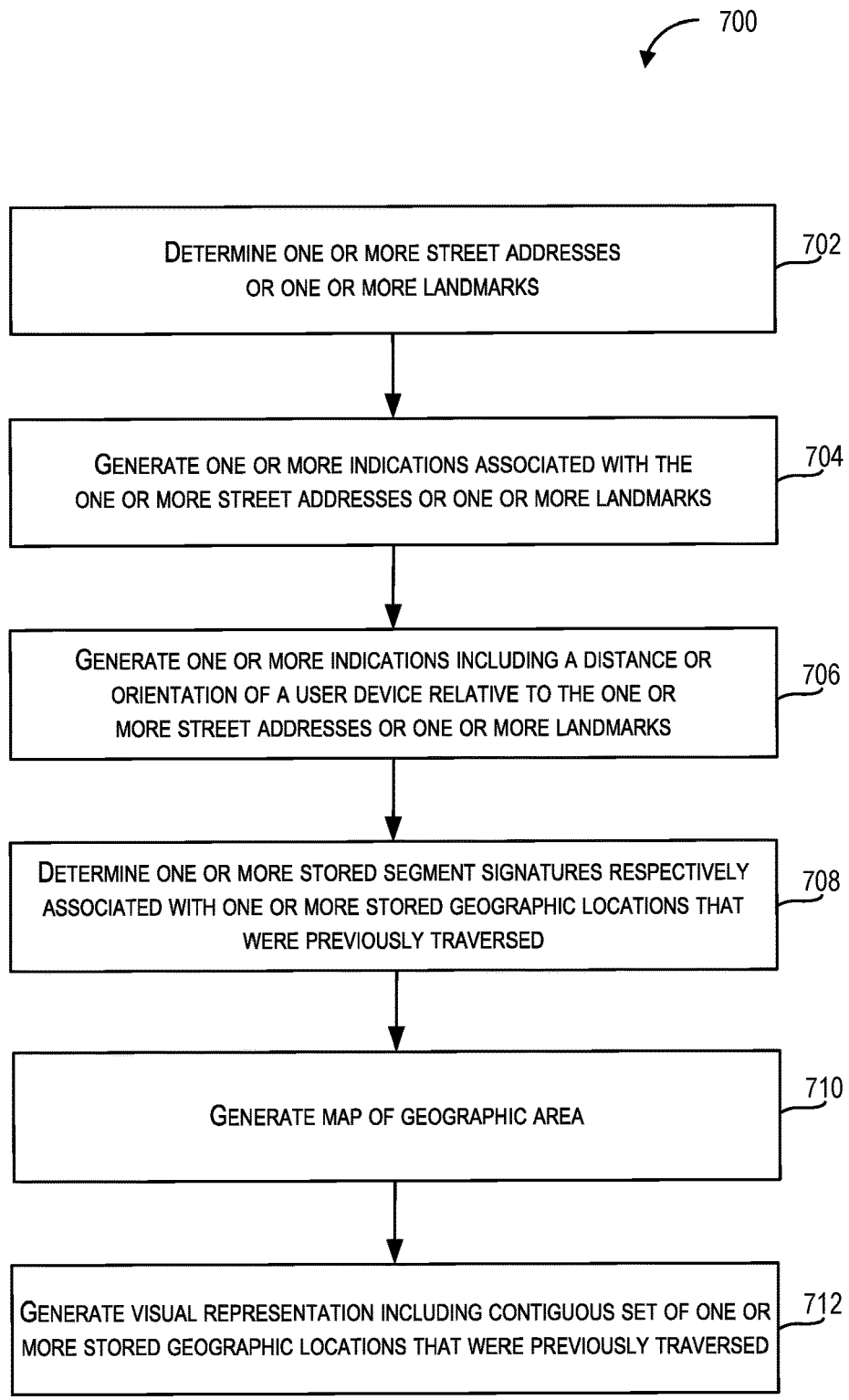
FIG. 7 depicts a flow diagram of surface detection and geolocation according to example embodiments of the present disclosure.

FIG. 7 depicts a flow diagram of surface detection and geolocation according to example embodiments of the present disclosure. One or more portions of the method 700 can be executed and/or implemented on one or more computing devices or computing systems including, for example, the computing device 102, the computing system 130, the training computing system 150, and/or the computing device 200. Further, one or more portions of the method 700 can be executed or implemented as an algorithm on the hardware devices or systems disclosed herein. In some embodiments, one or more portions of the method 700 can be performed as part of the method 600 that is depicted in FIG. 6. FIG. 7 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At 702, the method 700 can include determining one or more street addresses and/or landmarks located within a predetermined distance of the geographic location of the user device. For example, the computing device 102 (e.g., the user device) can access map data stored on the computing device 102 and determine the one or more street addresses and/or landmarks within a predetermined distance of the computing device 102.

At 704, the method 700 can include generating one or more indications associated with the one or more street addresses and/or one or more landmarks. For example, the computing device 102 can generate a map that includes one or more street addresses with labels (e.g., the street number) and directional indications (e.g., the direction of travel along one-way streets and two-way streets). Further, the computing device 102 can generate one or more textual indications (e.g., the name of a monument), one or more pictographic indications (e.g., one or more icons to indicate a monument), and/or one or more photographic indications (e.g., one or more photographic images of a monument).

At 706, the method 700 can include generating the one or more indications including a distance or orientation of the user device relative to the one or more street addresses and/or one or more landmarks. For example, the computing device 102 can use the geographic location of the computing device 102 to determine the distance of the computing device 102 relative to a particular street address. Further, the computing device 102 can use the one or more locations of the one or more street addresses to determine the orientation of the computing device 102.

At 708, the method 700 can include determining, based at least in part on the one or more segment signatures, one or more stored segment signatures respectively associated with one or more stored geographic locations that were previously traversed from the geographic location of the user device. For example, the computing device 102 can access the one or more stored segment signatures to determine whether the geographic location of the computing device 102 has previously been visited and/or traversed.

At 710, the method 700 can include generating a map of the geographic area that can include one or more indications associated with the one or more stored geographic locations that were previously traversed and/or visited from the geographic location of the user device. For example, the computing device 102 can generate a map of the geographic area on a display device of the computing device 102. The map can include one or more indications that use different colors to show the one or more stored geographic locations that were previously traversed and/or visited. In some embodiments, the one or more indications can include one or more indications of the date and/or time each of the one or more stored geographic locations was visited.

At 712, the method 700 can include generating a visual representation that can include a contiguous set of the one or more stored geographic locations that were previously traversed from the geographic location of the user device. For example, the computing device 102 can generate a visual representation that shows the one or more stored geographic locations that are contiguous and/or within a predetermined distance of another of the one or more stored geographic locations. In some embodiments, the one or more stored geographic locations that are contiguous and/or within the predetermined distance of another of the one or more stored geographic locations can be represented in a first color (e.g., orange) and the remaining one or more stored geographic locations can be represented in a second color (e.g., purple).

Figure 8:
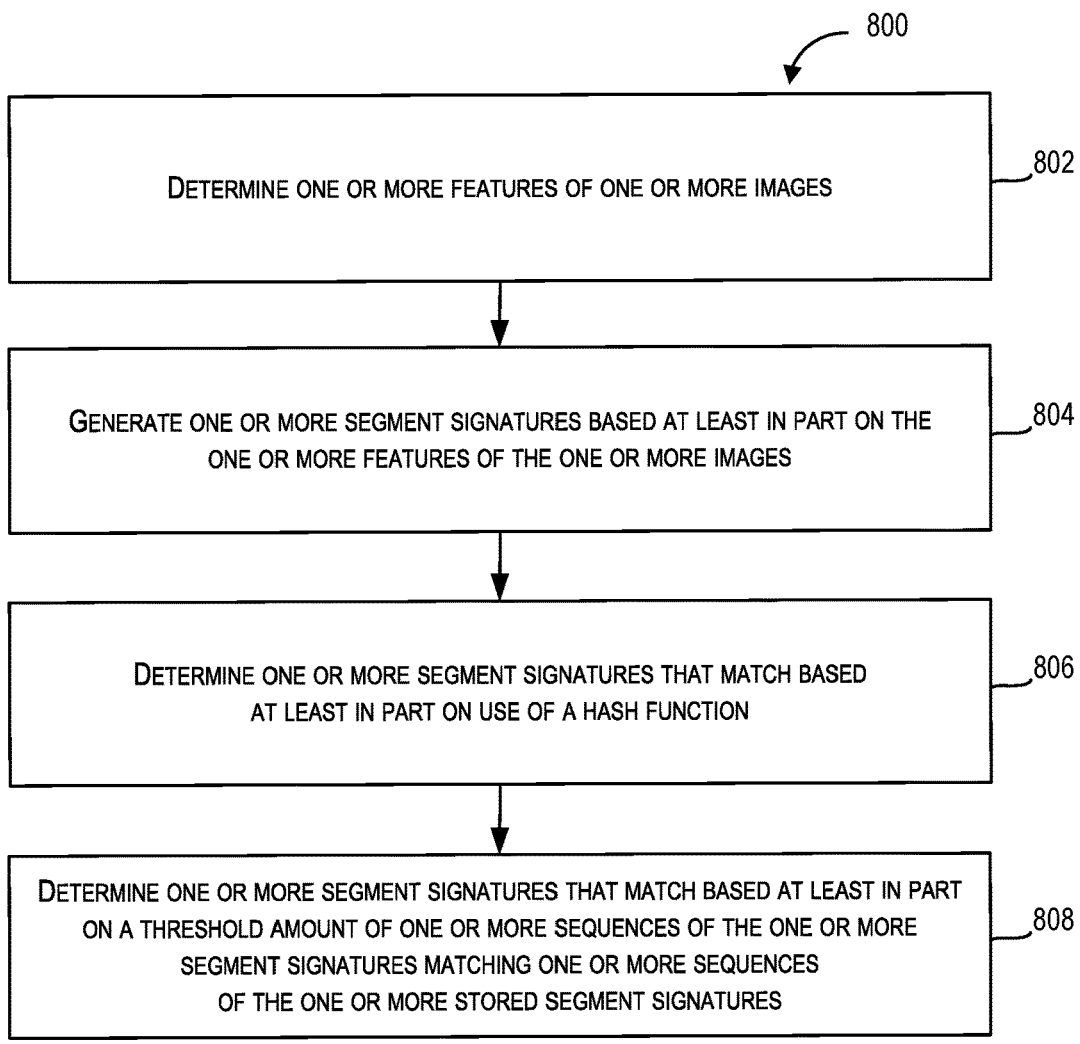
FIG. 8 depicts a flow diagram of surface detection and geolocation according to example embodiments of the present disclosure.

FIG. 8 depicts a flow diagram of surface detection and geolocation according to example embodiments of the present disclosure. One or more portions of the method 800 can be executed and/or implemented on one or more computing devices or computing systems including, for example, the computing device 102, the computing system 130, the training computing system 150, and/or the computing device 200. Further, one or more portions of the method 800 can be executed or implemented as an algorithm on the hardware devices or systems disclosed herein. In some embodiments, one or more portions of the method 800 can be performed as part of the method 600 that is depicted in FIG. 6. FIG. 8 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At 802, the method 800 can include determining one or more features of the one or more images based at least in part on performance of one or more feature detection operations on the one or more images. For example, the computing device 102 (e.g., the user device) can perform one or more operations to detect visual features of the one or more images.

At 804, the method 800 can include generating the one or more segment signatures based at least in part on the one or more features of the one or more images. For example, the computing device 102 can use the spatial relationships between the one or more features of the one or more images to generate the one or more segment signatures.

At 806, the method 800 can include determining, based at least in part on use of a hash function, the one or more segment signatures that match the one or more stored segment signatures that are indexed in the hash table. For example, the computing device 102 can match each of the one or more segment signatures to a respective one of the one or more stored segment signatures that are associated with a hash table in which the one or more stored segment signatures and/or the corresponding one or more stored geographic locations are stored.

At 808, the method 800 can include determining that the one or more segment signatures match the one or more stored segment signatures when a threshold amount of one or more sequences of the one or more segment signatures matches one or more sequences of the one or more stored segment signatures. For example, the computing device 102 can compare one or more sequences of the one or more segment signatures (e.g., a sequence of the one or more segment signatures in which one segment signature follows another segment signature in an order based at least in part on when each respective segment signature was generated and/or determined) to one or more sequences of the one or more stored segment signatures. The computing device 102 can then determine that the one or more segment signatures match the one or more stored segment signatures when a threshold amount of one or more sequences of the one or more segment signatures matches one or more sequences of the one or more stored segment signatures. For example, the threshold amount can be associated with a proportional amount (e.g., a percentage of matches between the one or more segment signatures and the one or more stored segment signatures) and/or a predetermined amount (e.g., a number of matches between the one or more segment signatures and the one or more stored segment signatures). For example, the computing device 102 can determine that the one or more segment signatures match the one or more stored segment signatures when greater then seventy-five percent (75%) are the same and/or similar.

In some embodiments, determining that the one or more segment signatures match the one or more stored segment signatures can include performing one or more sequence matching operations to determine similarity between one or more sequences of the one or more segment signatures and one or more sequences of the one or more stored segment signatures. For example, the computing device 102 can perform one or more sequence matching operations on the one or more segment signatures to determine one or more sequences of the one or more stored segment signatures that match. The one or more sequence matching operations can improve matching effectiveness by using multiple segment signatures and stored segment signatures.

Figure 9:
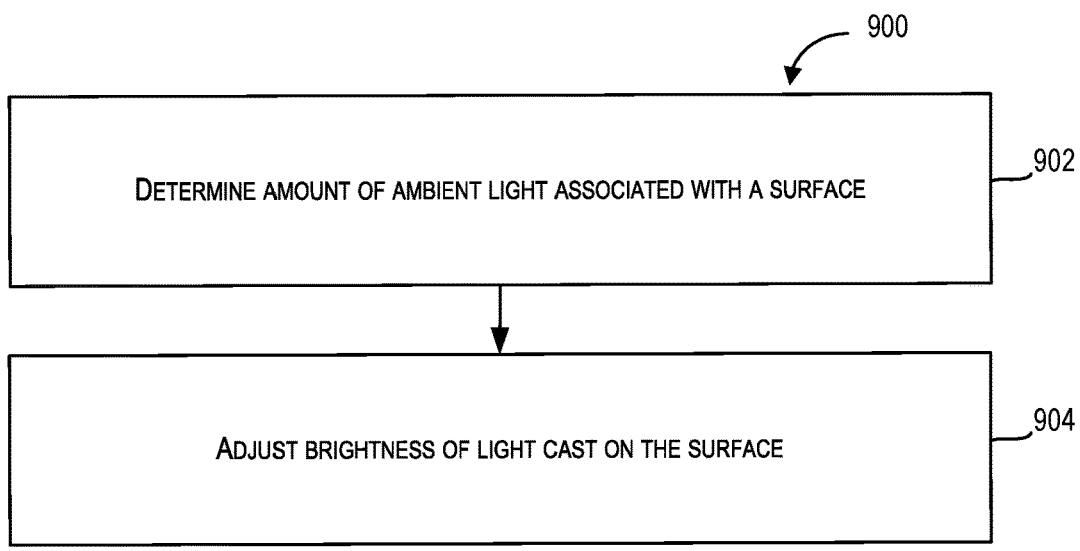
FIG. 9 depicts a flow diagram of surface detection and geolocation according to example embodiments of the present disclosure.

FIG. 9 depicts a flow diagram of surface detection and geolocation according to example embodiments of the present disclosure. One or more portions of the method 900 can be executed and/or implemented on one or more computing devices or computing systems including, for example, the computing device 102, the computing system 130, the training computing system 150, and/or the computing device 200. Further, one or more portions of the method 900 can be executed or implemented as an algorithm on the hardware devices or systems disclosed herein. In some embodiments, one or more portions of the method 900 can be performed as part of the method 600 that is depicted in FIG. 6. FIG. 9 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At 902, the method 900 can include determining an amount of ambient light associated with the surface of the environment. For example, the computing device 102 (e.g., the user device) can use one or more sensors (e.g., one or more visual spectrum cameras) that have the surface in their field of view to detect the amount of ambient light on and/or around the surface.

At 904, the method 900 can include adjusting, based at least in part on the amount of ambient light, a brightness of light that is cast on the one or more segments (of the surface of the environment). For example, the computing device 102 can lower the brightness of light that is cast on the one or more segments of the surface of the environment when the ambient light around the surface is determined to be bright enough. Further, the computing device 102 can increase the brightness of light that is cast on the one or more segments of the surface of the environment when the ambient light around the surface is determined to be too dim.

Figure 10:
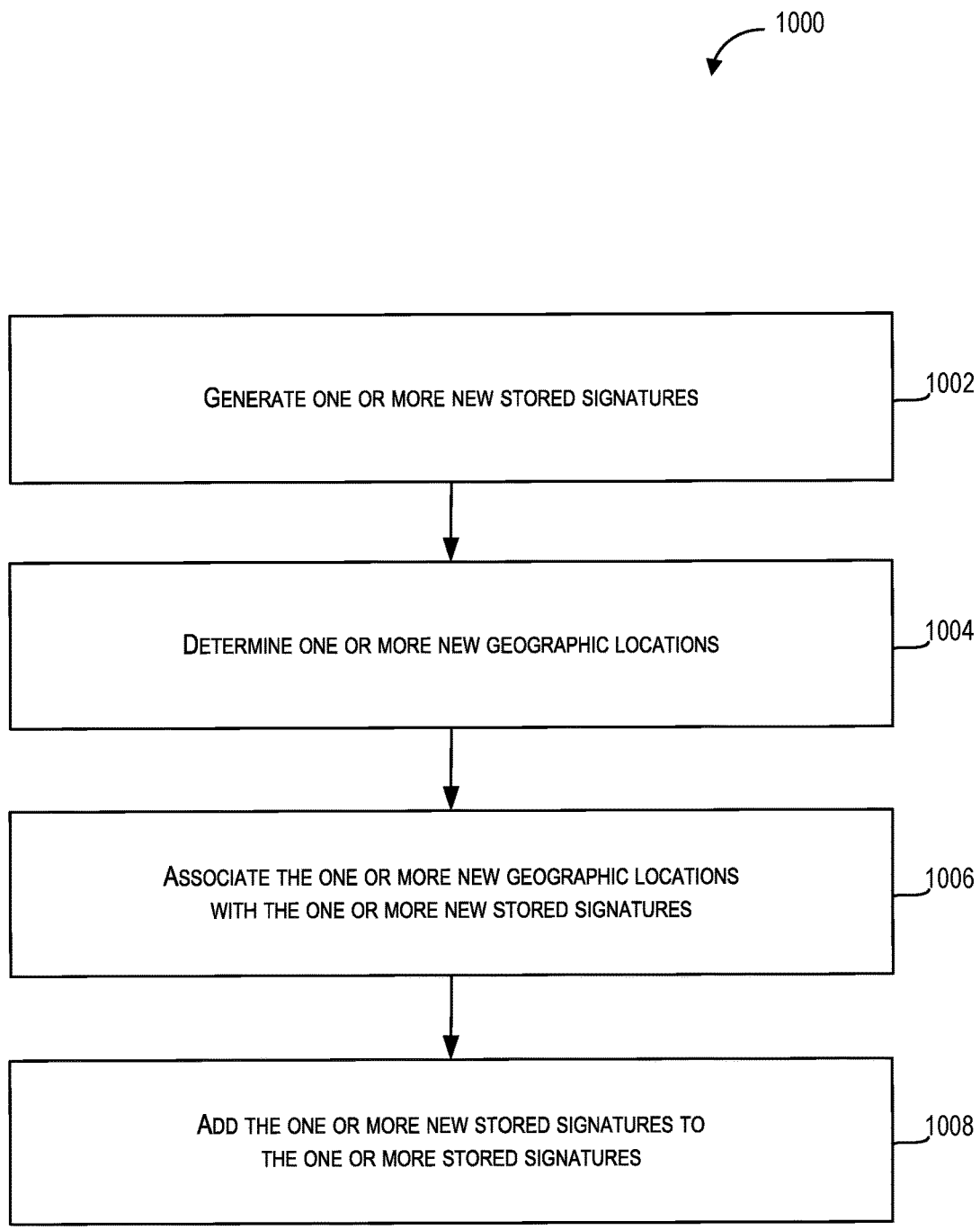
FIG. 10 depicts a flow diagram of surface detection and geolocation according to example embodiments of the present disclosure.

FIG. 10 depicts a flow diagram of surface detection and geolocation according to example embodiments of the present disclosure. One or more portions of the method 1000 can be executed and/or implemented on one or more computing devices or computing systems including, for example, the computing device 102, the computing system 130, the training computing system 150, and/or the computing device 200. Further, one or more portions of the method 1000 can be executed or implemented as an algorithm on the hardware devices or systems disclosed herein. In some embodiments, one or more portions of the method 1000 can be performed as part of the method 600 that is depicted in FIG. 6. FIG. 10 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At 1002, the method 1000 can include generating one or more new stored segment signatures based at least in part on the one or more segment signatures that do not match the one or more stored segment signatures. For example, the computing device 102 (e.g., the user device) can, in response to determining that one or more segment signatures do not match the one or more stored segment signatures, generate the one or more new stored segment signatures.

At 1004, the method 1000 can include determining, based at least in part on secondary geographic location data, one or more new geographic locations associated with the one or more new stored segment signatures. For example, the computing device 102 can access secondary geographic location data that includes a new geographic location of the computing device 102 that is based at least in part on triangulation of a plurality of signals from cellular towers.

At 1006, the method 1000 can include associating the one or more new geographic locations with the one or more new stored segment signatures. The computing device 102 can associate the new geographic location (e.g., a latitude, longitude, and/or altitude) of the computing device 102 with the new stored segment signature. Associating the new geographic location with the new stored segment signature can include modifying the new stored segment signature to include the new geographic location and/or a link to information associated with the new geographic location.

At 1008, the method 1000 can include adding the one or more new stored segment signatures to the one or more stored signatures. The computing device 102 can add the new stored segment signature to the one or more stored signatures. Accordingly, when the computing device 102 is at the same geographic location at some time in the future, the newly added segment signature can be part of the one or more stored segment signatures that are used to determine the location of the computing device 102.

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method of on-device geolocation, the computer-implemented method comprising:

receiving, by a user device comprising one or more processors, location request data associated with a request for a geographic location of a user device in an environment;

accessing, by the user device, based at least in part on the location request data, one or more images of one or more segments of a surface of the environment;

extracting, by the user device, one or more features from at least a respective image in the one or more images;

generating, by the user device, a segment signature for the respective image based on the one or more features;

determining, by the user device, the geographic location of the user device based at least in part on a determination that the segment signature matches one or more stored segment signatures respectively associated with one or more stored geographic locations accessing, by the user device, map data comprising information associated with a geographic area; and generating, by the user device, one or more visual indications on a map displayed within a user interface of the user device comprising information associated with the geographic location of the user device within the geographic area.

2. The computer-implemented method of claim 1, wherein the one more indications comprise a visual representation of the user device within the geographic area.

3. The computer-implemented method of claim 1, wherein the generating, by the user device, one or more indications comprising information associated with the geographic location of the user device within the geographic area comprises:
   determining, by the user device, one or more street addresses or one or more landmarks located within a predetermined distance of the geographic location of the user device; and
   generating, by the user device, one or more indications associated with the one or more street addresses or one or more landmarks.

4. The computer-implemented method of claim 3, further comprising:
   generating, by the user device, the one or more indications comprising a distance or orientation of the user device relative to the one or more street addresses or one or more landmarks.

5. The computer-implemented method of claim 3, wherein the generating, by the user device, one or more indications comprising information associated with the geographic location of the user device within the geographic area comprises:
   determining, by the user device, based at least in part on one or more segment signatures, the one or more stored segment signatures respectively associated with one or more stored geographic locations that were previously traversed from the geographic location of the user device; and
   generating, by the user device, a map of the geographic area comprising one or more indications associated with the one or more stored geographic locations that were previously traversed from the geographic location of the user device.

6. The computer-implemented method of claim 5, further comprising:
   generating, by the user device, a visual representation comprising a contiguous set of the one or more stored geographic locations that were previously traversed from the geographic location of the user device.

7. The computer-implemented method of claim 1, wherein the determining, by the user device, the geographic location of the user device based at least in part on the determination that the segment signature matches one or more stored segment signatures respectively associated with one or more stored geographic locations comprises:
   extracting, by the user device, one or more features from at least a respective image in the one or more images based at least in part on performance of one or more feature detection operations on the one or more images.

8. The computer-implemented method of claim 7, wherein the one or more feature detection operations comprise one or more operations associated with a scale-invariant feature transform technique, one or more operations associated with a gradient location and orientation histogram technique, or one or more operations associated with a histogram of oriented gradients technique.

9. The computer-implemented method of claim 1, wherein the one or more stored segment signatures are indexed in a hash table, and wherein the determining, by the user device, the geographic location of the user device based at least in part on the one or more segment signatures that match one or more stored segment signatures respectively associated with one or more stored geographic locations comprises:
   determining, by the user device, based at least in part on use of a hash function, the one or more segment signatures that match the one or more stored segment signatures that are indexed in the hash table.

10. The computer-implemented method of claim 1, wherein the determining, by the user device, the geographic location of the user device based at least in part on the determination that the segment signature matches one or more stored segment signatures respectively associated with one or more stored geographic locations comprises:
    determining, by the user device, that the respective signature matches the one or more stored segment signatures when a threshold amount of one or more sequences of the one or more segment signatures matches one or more sequences of the one or more stored segment signatures.

11. The computer-implemented method of claim 1, further comprising:
    determining, by the user device, an amount of ambient light associated with the surface of the environment; and
    adjusting, by the user device, based at least in part on the amount of ambient light, a brightness of light that is cast on the one or more segments.

12. The computer-implemented method of claim 1, further comprising:
    generating, by the user device, one or more new stored signatures based at least in part on the one or more segment signatures that do not match the one or more stored segment signatures;
    determining, by the user device, based at least in part on secondary geographic location data, one or more new geographic locations associated with the one or more new stored signatures;
    associating, by the user device, the one or more new geographic locations with the one or more new stored segment signatures; and
    adding, by the user device, the one or more new stored segment signatures to the one or more stored segment signatures.

13. The computer-implemented method of claim 12, wherein the secondary geographic location data is based at least in part on one or more localization operations comprising use of one or more global positioning system signals, one or more location beacons, or odometry.

14. The computer-implemented method of claim 1, further comprising:
    controlling, by the user device, one or more vehicle systems of a vehicle based at least in part on the one or more indications, wherein the one or more vehicle systems comprise one or more motor systems, one or more steering systems, one or more notification systems, or one or more braking systems.

15. The computer-implemented method of claim 1, wherein the one or more stored segment signatures are indexed using one or more spatial trees or one or more binary trees.

16. The computer-implemented method of claim 1, wherein the one or more stored segment signatures are based at least in part on a historical average of one or more features associated with the one or more stored segment signatures.

17. The computer-implemented method of claim 1, wherein the one or more images are based at least in part on detection of the environment by one or more sensors comprising one or more visible spectrum cameras, one or more infrared cameras, one or more light detection and ranging (LiDAR) devices, or one or more sonar devices.

18. The computer-implemented method of claim 1, wherein the one or more sensors are located on one or more portions of a vehicle, and wherein the one or more portions of the vehicle comprise one or more bumpers of a vehicle, an undercarriage of the vehicle, or one or more side panels of the vehicle.

19. One or more tangible non-transitory computer-readable media storing computer-readable instructions that when executed by one or more processors cause the one or more processors to
- receive location request data associated with a request for a geographic location of a user device in an environment;
- access based at least in part on the location request data, one or more images of one or more segments of a surface of the environment;
- extract one or more features from at least a respective image in the one or more images;
- generate a segment signature for the respective image based on the one or more features;
- determine the geographic location of the user device based at least in part on a determination that the segment signature matches one or more stored segment signatures respectively associated with one or more stored geographic locations;
- access map data comprising information associated with a geographic area; and
- generate one or more visual indications on a map displayed within a user interface of the user device comprising information associated with the geographic location of the user device within the geographic area.

20. A computing system comprising:
- one or more processors;
- one or more non-transitory computer-readable media storing instructions that when executed by the one or more processors cause the one or more processors to
- receive location request data associated with a request for a geographic location of a user device in an environment;
- access based at least in part on the location request data, one or more images of one or more segments of a surface of the environment;
- extract one or more features from at least a respective image in the one or more images;
- generate a segment signature for the respective image based on the one or more features;
- determine the geographic location of the user device based at least in part on a determination that the segment signature matches one or more stored segment signatures respectively associated with one or more stored geographic locations;
- access map data comprising information associated with a geographic area; and
- generate one or more visual indications on a map displayed within a user interface of the user device comprising information associated with the geographic location of the user device within the geographic area.

* * * * *